US012043273B2

(12) United States Patent
Lu et al.

(10) Patent No.: US 12,043,273 B2
(45) Date of Patent: Jul. 23, 2024

(54) VEHICLE DISENGAGEMENT SIMULATION AND EVALUATION

(71) Applicant: Woven by Toyota, U.S., Inc., Palo Alto, CA (US)

(72) Inventors: David Tse-Zhou Lu, Menlo Park, CA (US); Sameer Qureshi, Sunnyvale, CA (US); Shaojing Li, Mountain View, CA (US); Luc Vincent, Palo Alto, CA (US)

(73) Assignee: Woven by Toyota, U.S., Inc., Palo Alto, CA (US)

( * ) Notice: Subject to any disclaimer, the term of this patent is extended or adjusted under 35 U.S.C. 154(b) by 705 days.

(21) Appl. No.: 17/104,716

(22) Filed: Nov. 25, 2020

(65) Prior Publication Data

US 2022/0161811 A1 May 26, 2022

(51) Int. Cl.
*B60W 50/08* (2020.01)
*B60W 50/04* (2006.01)
*B60W 50/14* (2020.01)
*B60W 60/00* (2020.01)

(52) U.S. Cl.
CPC ........ *B60W 50/082* (2013.01); *B60W 50/045* (2013.01); *B60W 50/14* (2013.01); *B60W 60/0053* (2020.02); *B60W 2556/10* (2020.02)

(58) Field of Classification Search
CPC .. B60W 50/082; B60W 50/045; B60W 50/14; B60W 60/0053; B60W 2556/10; B60W 40/09; B60W 60/0059; B60W 2050/0028
See application file for complete search history.

(56) References Cited

U.S. PATENT DOCUMENTS

| 8,954,217 | B1* | 2/2015 | Montemerlo | ... B60W 60/00276 |
| | | | | 701/411 |
| 2015/0120124 | A1* | 4/2015 | Bartels | .............. B60W 60/0053 |
| | | | | 701/23 |
| 2021/0191394 | A1* | 6/2021 | Dudley | ................ G05D 1/0061 |
| 2022/0068052 | A1* | 3/2022 | Maeta | .................. G07C 5/0808 |

* cited by examiner

*Primary Examiner* — James J Lee
*Assistant Examiner* — Andrew Sang Kim
(74) *Attorney, Agent, or Firm* — Christopher G. Darrow; Darrow Mustafa PC

(57) ABSTRACT

A method includes generating, while a vehicle is operating in an autonomous-driving mode, a planned trajectory associated with a computing system of the vehicle based on first sensor data capturing an environment of the vehicle. The method further includes, while the vehicle is operating according to the planned trajectory, receiving a disengagement instruction associated that causes the vehicle to disengage from operating in the autonomous-driving mode and switch to operating in a disengagement mode. Subsequent to the vehicle operating in the disengagement mode, the method further includes capturing second sensor data and generating a simulation of the environment. The simulation is based on sensor data associated with the environment and the planned trajectory. Additionally, subsequent to the vehicle operating in the disengagement mode, the method concludes with evaluating a performance of an autonomy system based on the simulation, and providing feedback based on the evaluation.

17 Claims, 11 Drawing Sheets

VEHICLE DISENGAGEMENT SIMULATION AND EVALUATION

TECHNICAL FIELD

This disclosure relates generally to autonomous or semi-autonomous driving and, more specifically, to vehicle disengagement simulation and evaluation.

BACKGROUND

Autonomy systems for an autonomous or semi-autonomous vehicle may generally include one or more systems or subsystems that may be utilized to perceive the surroundings of the vehicle at any given point in time and to generate a planned trajectory for allowing the vehicle to safely and comfortably navigate residential and urban environments and in accordance with the local and/or regional traffic laws of the residential and urban environments. Indeed, while training autonomy systems to maximize efficiency and efficacy when operating in the autonomous-driving mode may be based upon on data collected over thousands or millions of miles driven by human drivers, there may nevertheless remain certain driving scenarios in which the autonomy systems performs less optimally in the autonomous-driving mode as compared to vehicle when driven by human drivers. As such, real-world performance testing may generally be conducted under the supervision of a supervisory driver, such that the autonomous operation of the vehicle may be generally disengaged at any time at the discretion of the supervisory driver.

However, in some instances, the supervisory driver of the vehicle may become overly cautious or overzealous in their subjective discretion to disengage, and thus many disengagements of the vehicle from operating autonomously may often be unnecessary. Specifically, while there may be some instances in which the supervisory driver of the vehicle may have disengaged because the supervisory driver deemed their experience in handling certain driving scenarios superior to that of the vehicle or due to a less than optimal operation of the autonomy system of the vehicle for certain encountered driving scenarios, it may be useful to distinguish between appropriate disengagements performed to better handle difficult driving scenarios and those performed unnecessarily or prematurely by the supervisory driver (e.g., before the vehicle was allowed to operate safely autonomously and without the need to disengage). Indeed, it may be further useful to train the supervisory driver to disengage more judiciously.

DESCRIPTION OF EXAMPLE EMBODIMENTS

Figure 1:
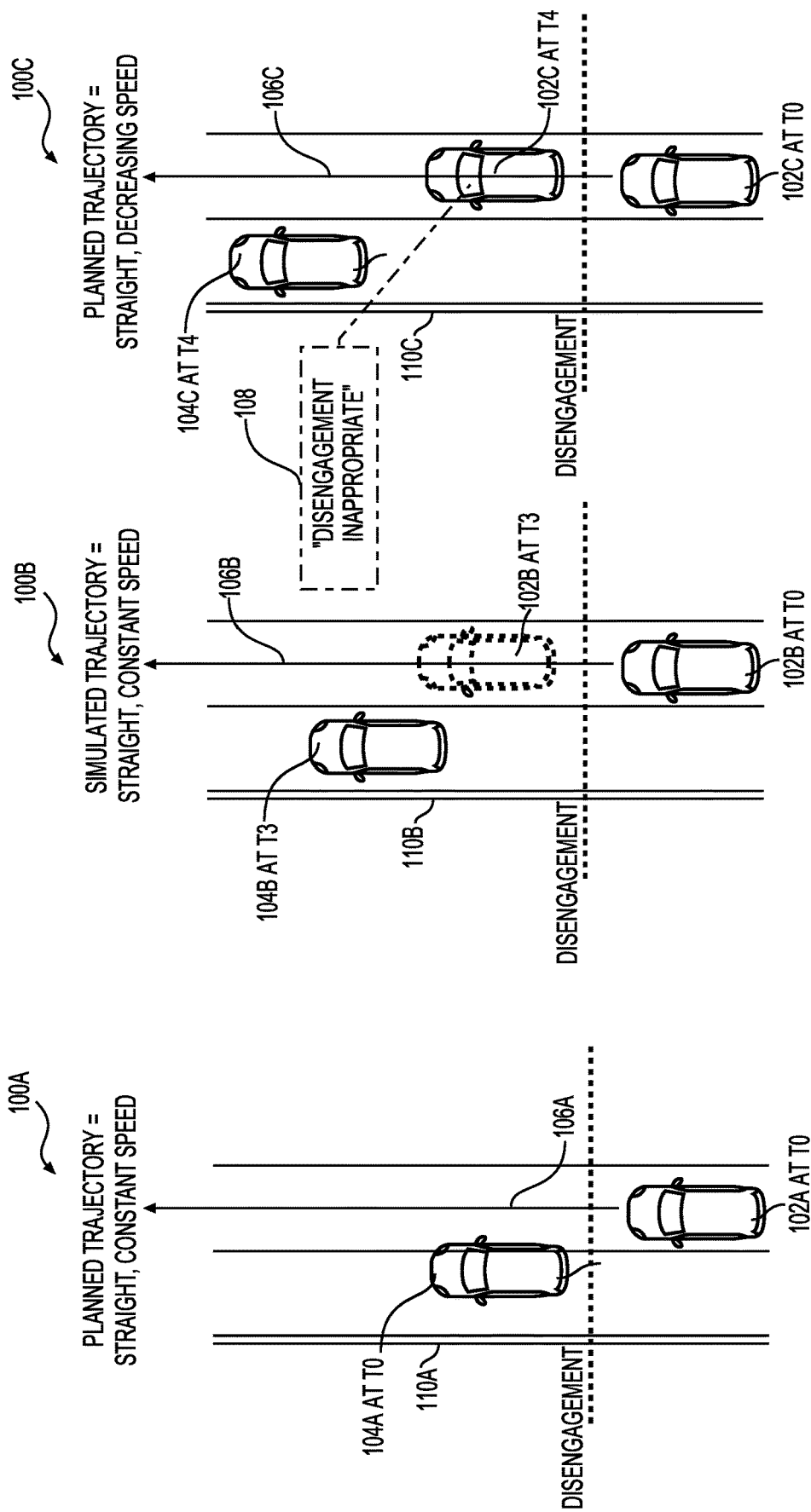
FIGS. 1A, 1B, and 1C illustrate example driving scenarios in which a disengagement is performed.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

Autonomy systems for an autonomous or semi-autonomous vehicle may generally include one or more systems or subsystems that may be utilized to perceive the surroundings of the vehicle at any given point in time and to generate a planned trajectory for allowing the vehicle to safely and comfortably navigate residential and urban environments and in accordance with the local and/or regional traffic laws of the residential and urban environments. Indeed, while training autonomy systems to maximize efficiency and efficacy when operating in the autonomous-driving mode may be based upon data collected over thousands or millions of miles driven by human drivers, there may nevertheless remain certain driving scenarios in which the autonomy systems performs less optimally in the autonomous-driving mode as compared to vehicle when driven by human drivers. As such, real-world performance testing may generally be conducted under the supervision of a supervisory driver, such that the autonomous operation of the vehicle may be generally disengaged at any time at the discretion of the supervisory driver.

In certain instances, a disengagement (e.g., disengaging the vehicle from operating in the autonomous-driving mode to operating in the operator-driving mode) may occur at a given point in time while the vehicle is operating within the autonomous-driving mode. For example, in an example autonomous-driving mode scenario, a disengagement may occur at a point during the planned trajectory in which the vehicle, for example, approaches an intersection or other scenario in which the vehicle may possibly encounter an agent (e.g., another vehicle, a pedestrian, a bicyclist, and so forth). In such a case, a supervisory driver of the vehicle may have disengaged because the supervisory driver may have perceived a potentially hazardous condition within the environment (e.g., at a later point during the planned trajectory). Another possibility is that the supervisory driver of the vehicle may have been overly cautious or overzealous with respect to the disengagement, and thus the supervisory driver may have disengaged prematurely or unnecessarily. In another example autonomous-driving mode scenario, a disengagement may occur at a point during the planned trajectory in which the vehicle, for example, approaches an agent from behind. In this case, the supervisory driver of the vehicle may have disengaged because the supervisory driver may have believed (e.g., based on the planned trajectory) that the vehicle was decelerating (e.g., braking) too slowly to safely come to a stop before potentially colliding with the agent. Another possibility is that the supervisory driver of the vehicle may have disengaged because the supervisory driver may have believed that the vehicle was veering too closely to a curb along the roadway.

Thus, as the forgoing elucidates, many of the instances in which the supervisory driver of the vehicle may disengage may generally be at the discretion of the particular supervisory driver of the vehicle. For example, in some instances, the supervisory driver of the vehicle may misjudge a particular driving scenario or situation, even when the planned trajectory generated by the autonomous-driving system includes correct driving parameters and information about the driving maneuvers which the vehicle is to perform in the future. Indeed, while there may be some instances in which the supervisory driver of the vehicle may have disengaged appropriately because of a detected misoperation (e.g., temporary misoperation or less than optimal operation of one or more systems or subsystems of the vehicle) or vehicle self-diagnosed maintenance issue, it may be useful to distinguish between appropriate and inappropriate disengagements. Specifically, it may be useful to simulate, after disengagement from autonomous-driving mode, the planned trajectories of the vehicle and/or one or more agents to determine what would have occurred had the vehicle continued operating in the autonomous-driving mode (e.g., post-disengagement) and evaluate whether the disengagement was appropriate.

Indeed, distinguishing between appropriate and inappropriate disengagements may allow supervisory drivers to be trained to disengage more judiciously, and particularly during road testing of autonomous or semi-autonomous vehicles. Specifically, the accumulation of real-world data may be of particular import for testing, but such data would inconsistent if supervisory drivers disengage helter-skelter. Further, the data would also be incomplete if supervisory drivers disengage prematurely, preempting the autonomous or semi-autonomous vehicle from acting on its own in accordance with the planned trajectory. To train the supervisory drivers to disengage more judiciously, in some instances, the supervisory drivers may be provided a report card at the end of each day or at the end of each road-test. However, by then, the supervisory drivers would have lost all of the driving context and would have forgotten what led to the disengagement in the first place. Furthermore, distinguishing between appropriate and inappropriate disengagements may allow appropriate disengagements to be flagged for later investigation based on severity to determine whether one or more systems or subsystems of the vehicle misoperated (e.g., temporarily misoperated or operated less than optimally), such that one or more vehicles of a deployed fleet of vehicles may be immediately taken offline in such instances.

Accordingly, the present embodiments are directed toward simulating and evaluating disengagements in autonomous vehicles or semi-autonomous vehicles and providing actionable feedback to operations personnel (e.g., supervisory drivers, technicians, developers, and so forth) based thereon. In some embodiments, the present embodiments may include generating, based on sensor data, perception data that corresponds to perceived behavior of one or more agents within the environment surrounding the vehicle. The perception data may be generated continuously based on continuous recording of the raw sensor data by the vehicle (e.g., captured over a time period commencing before the disengagement occurred and ending a period of time after the disengagement occurred). After the disengagement is determined as having occurred, the compute system may evaluate and assess the disengagement by running a first simulation, based on a first simulation model, on the pre-disengagement planned trajectory of the vehicle and post-disengagement perception data. That is, the pre-disengagement planned trajectory, generated based on predicted agent behaviors, may be evaluated against actual agent behaviors or movements perceived subsequent to the disengagement. For example, the actual behaviors or movements of one or more agents within the environment may be simulated utilizing perception data, and the planned trajectory of the vehicle may be simulated to ascertain whether a potentially hazardous condition (e.g., a collision) were to have occurred had the vehicle proceeded according to the planned trajectory given the actual agent behaviors or movements (e.g., a recreation of a presumptive driving scenario—based on the planned trajectory of the vehicle and actual perception data—absent any disengagement event).

In other embodiments, after the disengagement is determined as having occurred, the compute system may evaluate and assess the disengagement by running a second simulation, based on a second simulation model, on the pre-disengagement planned trajectory of the vehicle and post-disengagement prediction data. That is, the pre-disengagement planned trajectory may be evaluated against predicted agent behaviors or movements predicted subsequent to the disengagement. For example, the predicted behaviors or movements of one or more agents within the environment may be simulated utilizing prediction data, and the planned trajectory of the vehicle may be simulated to ascertain what would have occurred had the vehicle proceeded according to the planned trajectory given the predicted agent behaviors (e.g., a recreation of a presumptive driving scenario—based on the planned trajectory of the vehicle and predicted data absent any disengagement event). Indeed, the second simulation may be useful because, in some instances, the observed actual occurrences b may deviate from what would have happened had the supervisory driver not disengaged (e.g., the actual occurrences may no longer be appropriate for evaluating the pre-disengagement plan). For example, some agents may behave differently post-disengagement in response to the supervisory driver's post-disengagement driving behavior (e.g., the supervisory driver may change lanes, causing an agent in the new lane to slow down, but had the driver not disengaged, the AV would have driven straight and the agent would have maintained its speed.)

In certain embodiments, one or both the first evaluation based on the first simulation model and the second evaluation based on the second simulation model may be utilized to generate an evaluation score representing an appropriateness of the disengagement. For example, in some embodiments, the first evaluation generated by the first simulation model and the second evaluation generated by the second simulation model may be scored or weighted (e.g., probabilities), for example, such that the first evaluation generated by the first simulation model based on perception data and/or sensor data may include a higher confidence score than the second evaluation generated by the second simulation model based on prediction data. For example, because the first evaluation generated by the first simulation model may be based on, for example, the actual agent behaviors or movements within the environment while the second evaluation generated by the second simulation model may be based on, for example, predicted agent behaviors or movements, the first evaluation generated by the first simulation model based on perception data and/or sensor data may be determined as having a higher confidence or probability of being accurate.

In this way, disengagements may be evaluated and assessed objectively and accurately to determine whether a particular disengagement was appropriate (e.g., due to temporary misoperation or less than optimal operation of one or more systems or subsystems of the vehicle) or inappropriate (e.g., due to an overly cautious or overzealous supervisory driver of the vehicle that disengaged prematurely), and actionable feedback may be generated (e.g., in real-time or near real-time while the disengagement event and driving context is at the forefront of the attention of the supervisory drivers). In one embodiment, the actionable feedback may include, for example, one or more notifications including a message of whether the disengagement is appropriate or inappropriate to train the supervisory driver of the vehicle to disengage more judiciously. In another embodiment, the actionable feedback may include, for example, one or more notifications of an operation health (and degree of severity) of one or more systems of the vehicle that may be provided to a cloud-based service or fog-based service to perform troubleshooting, updating, system shutdown, or other protocol to maximize safety and operational efficiency and efficacy of the vehicle.

As used herein, a "disengagement" or a "disengagement event" may refer to any event or action in which a supervisor (e.g., human driver or other operator) overrides an autonomous-driving mode of an autonomous or semi-autonomous vehicle and cause the autonomous or semi-autonomous vehicle to operate in an operator-driving mode (e.g., the supervisor assumes or reassumes control of driving the autonomous or semi-autonomous vehicle by instruction of the vehicle or at the discretion of the supervisor). For example, the "disengagement" or the "disengagement event" may refer to any event or action in which a supervisor (e.g., human driver or other operator) overrides an autonomous-driving mode of an autonomous or semi-autonomous vehicle and cause the autonomous or semi-autonomous vehicle to operate in an operator-driving mode (e.g., the supervisor assumes or reassumes control of driving the autonomous or semi-autonomous vehicle) in response to the supervisor perceiving one or more potential hazardous conditions (e.g., based on weather and/or road conditions, road and traffic communications, amount of agents within or nearby the drive path of the vehicle, particular driving laws within one or more local jurisdictions, and so forth) or in response to receiving one or more warnings from the autonomous or semi-autonomous vehicle that the vehicle is unable able to proceed safely (e.g., based on weather and/or road conditions, road and traffic communications, amount of agents within or nearby the drive path of the vehicle, particular driving laws within one or more local jurisdictions, and so forth).

With the forgoing in mind, it may be useful to describe an example driving scenarios of autonomous-driving followed by a disengagement, as illustrated, for example, by FIGS. 1A, 1B, and 1C. Specifically, FIGS. 1A, 1B, and 1C illustrate one or more running examples of autonomous-driving mode scenarios 100A, 100B, and 100C in which the vehicles 102A, 102B, and 102C each has a respective planned trajectory, in accordance with the presently disclosed embodiments. For example, each of the example autonomous-driving mode scenarios 100A, 100B, and 100C illustrates the planned trajectories 106A, 106B, and 106C for the vehicles 102A, 102B, and 102C as the vehicles 102A, 102B, and 102C travel along roadways 110A, 110B, and 110C. In certain embodiments, as illustrated by the example driving scenario 100A of FIG. 1A, the planned trajectory 106A for the vehicle 102A may include a constant velocity and a constant steering angle, such that the vehicle 102A may travel straight and at a constant velocity along the roadway 110A while operating in the autonomous-driving mode. In certain embodiments, as illustrated by the example simulated driving scenario 100B of FIG. 1B, the planned trajectory 106B for the vehicle 102B may include a constant velocity and a constant steering angle, such that the vehicle 102B may travel straight and at a constant velocity along the roadway 110B while operating in the autonomous-driving mode. For example, as will be discussed in greater detailed below, the example simulated driving scenario 100B of FIG. 1B may be a simulation of the planned trajectory 106A performed subsequent to a disengagement by a supervisory driver of the vehicle 102A in view of an agent vehicle 103A to determine whether the disengagement was appropriate or inappropriate, in accordance with the presently disclosed embodiments. Lastly, as illustrated by the example driving scenario 100C of FIG. 1C, the planned trajectory 106C for the vehicle 102C may include a decreasing velocity and a constant steering angle, such that the vehicle 102C may travel straight and at a decreased velocity along the roadway 110C while operating in the autonomous-driving mode.

In certain embodiments, as further illustrated by the one or more example driving scenarios 100A, 100B, and 100C, a disengagement (e.g., disengaging the vehicles 102A, from operating in the autonomous-driving mode to operating in the operator-driving mode) may occur at a given point in time while the respective vehicle 102A are operating in the autonomous-driving mode. For example, in the example autonomous-driving mode scenario 100A, a disengagement may occur at a point during the planned trajectory 106A in which the vehicle 102A, for example, is approaching an agent 104A (e.g., another vehicle at traveling at a constant velocity), but veering at least partially over the lane boundary separating the vehicle 102A and the agent 103A. In such a case, a supervisory driver of the vehicle 102A may have disengaged because the supervisory driver may have perceived a potentially hazardous condition (e.g., the supervisory driver may have thought the current planned trajectory 106A would cause the vehicle 102A to collide with the agent 104A at a later point during the planned trajectory 106A if the agent continued veering into lane of the vehicle 102A).

However, as shown in simulated driving scenario 100B, the planned trajectory 106B would have led the vehicle 102B to continue straight at the constant velocity and the agent 104B would have not veered into the lane of the vehicle 102B. In this example, the supervisory driver of the vehicle 102B may have disengaged simply because the supervisory driver had become nervous or overzealous with respect to disengaging in view of the agent 102B and unnecessarily disengaged from the autonomous-driving mode. Thus, as illustrated by example driving scenario 100C, the supervisory driver decreased the velocity of the vehicle 102C in view of the perceived veering of vehicle 104C. In such a case, the supervisory driver may receive real-time or near real-time contextual feedback 108, which indicates to the supervisory driver of vehicle 102C (e.g., while the driving scenario is at the forefront of the supervisory driver's mind) that the disengagement was inappropriate.

Thus, as the forgoing elucidates, the vehicle 102A may disengage from autonomous-driving mode at the discretion of the particular supervisory driver of the vehicle 102A, and the disengagements may not always be appropriate or correct. For example, as discussed above, the supervisory driver of the vehicle 102A may misjudge a particular driving scenario or situation and disengage even when the planned trajectory 106A would have appropriately handled the situation had the vehicle 102A continued to drive in autonomous-driving mode. Thus, it may be useful to distinguish between appropriate and inappropriate disengagements. Specifically, as will be further appreciated below with respect to FIGS. 3A, 3B, 4, 5A, and 5B, it may be useful to simulate the pre-disengagement planned trajectories, such as planned trajectory 106A, 106B, and 106C and/or one or more agents 104A to determine what would have occurred had the vehicle 102A continued operating in the autonomous-driving mode (e.g., post-disengagement).

Accordingly, the present embodiments are directed toward determining and evaluating disengagements in autonomous vehicles or semi-autonomous vehicles and providing actionable feedback to operations personnel (e.g., supervisory drivers, technicians, developers, and so forth) based thereon. In some embodiments, the present embodiments may include generating, based on sensor data, perception data that corresponds to perceived behavior of one or more agents 104 within the environment surrounding the vehicle 102. The perception data may be generated continuously based on continuous recording of raw sensor data by the vehicle 102, even after the vehicle 102 disengaged from autonomous-driving mode (e.g., sensor data may be captured over a time period commencing before the disengagement occurred and ending sometime after the disengagement occurred). After the disengagement is determined as having occurred, the compute system may evaluate and assess the disengagement by running a first simulation, based on a first simulation model, on the pre-disengagement planned trajectory of the vehicle 102 and post-disengagement perception data. That is, the pre-disengagement planned trajectory, which may be generated based on predicted agent behaviors, may be evaluated against actual agent 104 behaviors or movements perceived subsequent to the disengagement. For example, the actual behaviors or movements of one or more agents 104 within the environment may be simulated utilizing post-disengagement perception data, and the planned trajectory of the vehicle 102 may be simulated according to the pre-disengagement planned trajectory of the vehicle. The simulation may be used to determine what would have occurred had the vehicle 102 proceeded according to its planned trajectory with respect to the actual agent 104 behaviors or movements. In other words, the simulation provides a recreation of a presumptive driving scenario—based on the planned trajectory of the vehicle 102 and actual perception data—absent any disengagement event.

In other embodiments, after the disengagement is determined as having occurred, the compute system may evaluate and assess the disengagement by running a second simulation, based on a second simulation model, on the pre-disengagement planned trajectory of the vehicle 102 and prediction data generated based on pre-disengagement and/or post-disengagement perception data. That is, the pre-disengagement planned trajectory may be evaluated against predicted agent 104 behaviors or movements. In particular embodiments, the predicted agent 104 behaviors or movements may be generated using sensor and/or perception data captured prior to disengagement. In this case, the prediction data used to evaluate the pre-disengagement planned trajectory may be the same as the one used by the planning module 208 to generate the pre-disengagement planned trajectory. Since the prediction data in this embodiment only uses sensor and/or perception data captured prior to disengagement, the prediction data would not be influenced by the post-disengagement actions of the vehicle 102. In another embodiment, the predicted agent 104 behaviors or movements may have been generated based on sensor and/or perception data captured subsequent to the disengagement (e.g., 1 or 2 seconds of perceived contextual environment after the disengagement may be used to predict agent behavior in the next 10 seconds). In the first few seconds after disengagement (e.g., within 1 or 2 seconds), actual behavior of the agents 104 is unlikely to be significantly influenced by post-disengagement actions of the vehicle 102. Since the small window of post-disengagement perception data is unlikely to be tainted by the vehicle's 102 post-disengagement actions and is more up-to-date than pre-disengagement perception data, it may serve as a more reliable source of information for the prediction module 206 to predict a contextual environment in which the vehicle 102 had not disengaged. During simulation, behaviors or movements of one or more agents 104 within the environment may be simulated based on the prediction data, and movements of the vehicle 102 may be simulated using the pre-disengagement planned trajectory. The simulation would indicate what would have likely occurred had the vehicle 102 continued operating in the autonomous-driving mode (e.g., the simulation generates a recreation of a presumptive driving scenario—based on the planned trajectory of the vehicle 102 and predicted data—absent any disengagement event). In certain embodiments, one or more of the first evaluation based on the first simulation model and the second evaluation based on the second simulation model may be utilized to generate an evaluation score (e.g., the score may represent an appropriateness of the disengagement).

In this way, disengagements may be evaluated and assessed quickly, objectively, and accurately to determine whether a particular disengagement was appropriate or inappropriate, and actionable feedback may be generated (e.g., in real-time or near real-time). As previously explained, the speed at which the post-disengagement evaluation is performed is important (e.g., to give prompt feedback to the supervisor driver and/or alert the fleet of a potential systemic issue). Thus, in one embodiment, the on-board computing system of the vehicle 102 may perform the simulation and evaluation after the vehicle 102 disengaged from autonomous-driving mode. After disengagement, the on-board computing system of the vehicle 102 would no longer be occupied with active driving tasks, so the on-board computing system could be re-purposed to perform post-disengagement simulation and evaluation tasks. While using the computing system of the vehicle 102 would likely provide the fastest results, it may not always be the case. For example, a cloud-based service might be able to perform the same computation much faster than the computing system of the vehicle 102 to offset the transmission time needed for the vehicle 102 to wirelessly transfer the relevant data to the cloud-based service (e.g., the pre-disengagement planned trajectory, perception data, and/or prediction data). Thus, in particular embodiments, the vehicle 102 may offload the simulation and evaluation tasks to a cloud-based service.

The evaluation results of the disengagement may trigger one or more events. In one embodiment, the event may be an actionable feedback for the supervisory driver of the vehicle 102. For example, one or more notifications indicating whether the disengagement is appropriate or inappropriate may be provided to the driver (e.g., via a display, sound, or haptic feedback). The notifications may be used to train the supervisory driver of the vehicle 102 to disengage more consistently or judiciously. For example, after disengagement, the driver may be notified in real-time or near real-time of whether the disengagement was appropriate under the circumstances. The promptness of the notification helps ensure that the context that caused the driver to disengage is still fresh in the supervisory driver's mind. As such, the supervisory driver is enabled to more easily connect the context surrounding the disengagement with the provided feedback and adjust his/her future reactions to similar future contexts accordingly. For example, if the supervisory driver of vehicle 102A in scenario 100A received a notification that the disengagement was appropriate, the driver would learn to continue to disengage in similar circumstances. If the supervisory driver of vehicle 102A in scenario 100A or 100C received a notification that the disengagement was inappropriate, the driver would learn that disengagement is unnecessary in those circumstances.

In another embodiment, the actionable feedback triggered by the disengagement evaluation may include, for example, one or more notifications of an operation health (and degree of severity) of one or more systems of the vehicle 102 that may be provided to a cloud-based service or fog-based service to perform troubleshooting, updating, system shutdown, or other protocol to maximize safety and operational efficiency and efficacy of the vehicle 102. For example, when a disengagement is deemed appropriate, it may indicate that there is an edge-case that is not being appropriately handled by the vehicle's 102 autonomous-driving system. As such, the vehicle 102 may notify the fleet management system or developers of the vehicle 102 so that they may handle the issue as needed. In particular embodiments, the outcome of the simulation may further be used to gauge the severity of the operation health of the vehicle 102 and trigger different degrees of notifications accordingly. For example, if the simulation reveals that the vehicle 102 would have collided had the driver not disengaged the vehicle 102 from autonomous-driving mode, an alert may be sent to the fleet management system or developers so that they could commence a fleet-wide shut down if deemed necessary. If instead the simulation reveals that the vehicle 102 would have gotten undesirably close to another vehicle but no collision would have occurred, then the vehicle 102 may simply flag or store the relevant scenario in the on-board computing system to allow the scenario to be reviewed when time permits, without ever sending a real-time or near real-time notification to the fleet management system or developers of the vehicle 102.

Figure 2:
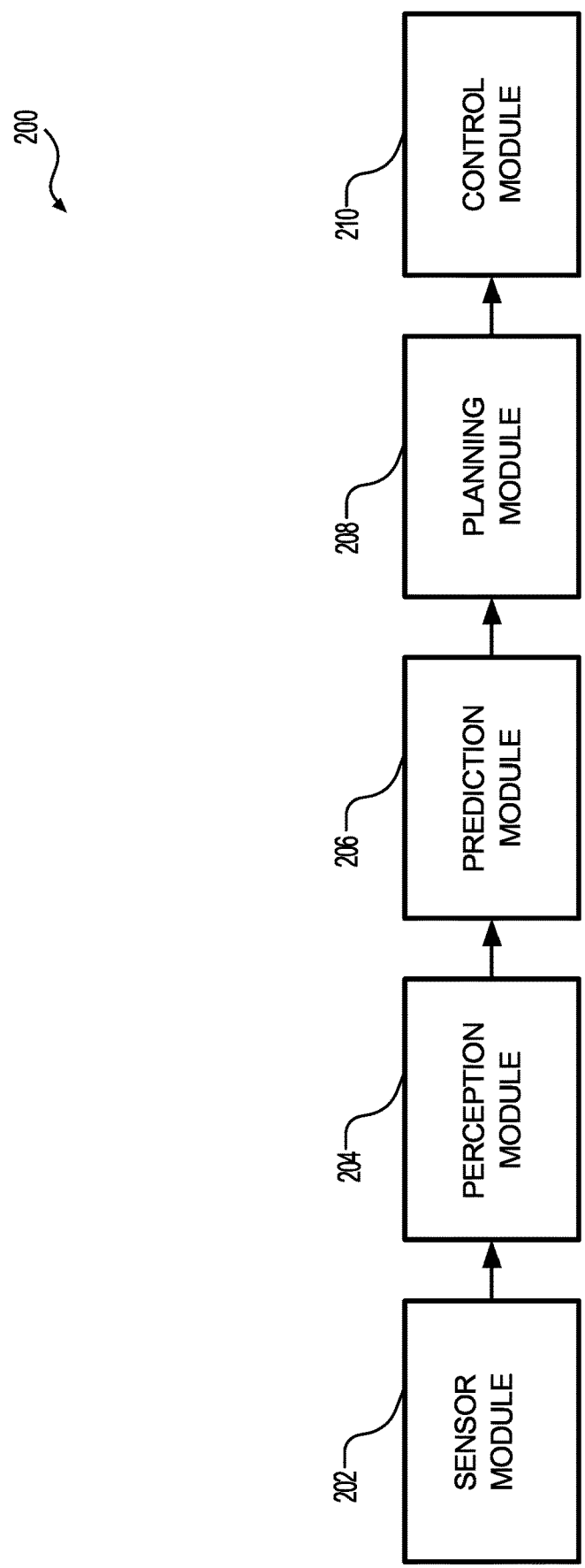
FIG. 2 illustrates an example block diagram of a compute system of an autonomous or semi-autonomous vehicle.

FIG. 2 illustrates an example block diagram of a compute system 200 configured for operating a vehicle in autonomous-driving mode, in accordance with the presently disclosed embodiments. For example, as depicted by FIG. 2, in some embodiments, the compute system 200 may include a number of computing modules, such as a sensor data module 202, a perception module 204, a prediction module 206, a planning module 208, and a control module 210.

The sensor data module 202 may obtain and pre-process sensor/telemetry data. Such data may be captured by any suitable sensors of the vehicle 102. In certain embodiments, the vehicle 102 may include, for example, one or more LiDAR sensors that may be utilized to transmit pulsed laser beams in multiple directions and measure the reflected signal from agents 104 or other objects surrounding the vehicle 102. The time of flight (ToF) of the light signals may be used to measure the distance or depth of the agents 104 or other objects from the LiDAR. In some embodiments, the vehicle 102 may include optical cameras pointing in different directions to capture images (e.g., still images, video images) of the surrounding of the vehicle 102. In certain embodiments, radars may also be used by the vehicle 102 for detecting other vehicles and/or other potential obstructions at a distance. As further examples, the vehicle 102 may be equipped with, for example, one or more ultrasonic sensors, electromagnetic imaging sensors, or thermal imaging sensors for close range object detection (e.g., parking and obstacle detection). The vehicle 102 may further include one or more infrared cameras for object detection when operating within, for example, low-lighting and/or dark locations. In certain embodiments, sensor data module 202 may suppress noise in the sensor data or normalize the sensor data. The sensor module 202 may be configured to receive sensor information from any suitable sensors and/or modules configured to sense information from the environment surrounding the vehicle 102.

In certain embodiments, the perception module 204 may be suitable for correlating and fusing the data from the different types of sensors of the sensor module 202 to model the contextual environment of the vehicle 102. The perception module 204 may utilize information extracted by multiple independent sensors to provide information that would not be available from any single type of sensors. In some embodiments, combining data from multiple sensor types allows the perception module 204 to leverage the strengths of different sensors and more accurately and precisely perceive the environment. For example, image-based object recognition may not work well in low-light conditions. This may be compensated by sensor data from LiDAR or radar, which are effective sensors for measuring distances to targets in low-light conditions. For example, image-based object recognition may mistakenly determine that an object depicted in a poster is an actual three-dimensional (3D) object in the environment. However, if depth information from a LiDAR is also available, the perception module 204 may utilize that additional information to correctly determine that the object in the poster is actually a two-dimensional (2D) object, for example.

In certain embodiments, the perception module 204 may process the available data (e.g., sensor data, data from a high-definition map, and so forth) to derive information about the contextual environment. For example, perception module 204 may include one or more agent modelers (e.g., object detectors, object classifiers, or machine-learning (ML) models trained to derive information from the sensor data) to detect and/or classify agents 104 present in the environment of the vehicle 102 (e.g., other vehicles 102, pedestrians, bicyclists, wildlife, vegetation, or any of various other moving and/or stationary objects). The perception module 204 may also determine various characteristics of the agents 104. For example, perception module 204 may track the velocities, moving directions, accelerations, trajectories, relative distances, or relative positions of these agents 104. In certain embodiments, the perception module 204 may also leverage information from a high-definition map. The high-definition map may include, for example, a precise 3D model of the environment, including buildings, curbs, street signs, traffic lights, and any stationary fixtures in the environment. In certain embodiments, GPS data and/or image-based localization techniques (e.g., simultaneous localization and mapping, or SLAM), the perception module 204 may determine the pose (e.g., position and orientation) of the vehicle 102 or the poses of the sensors of the vehicle 102 within the high-definition map. The pose information, in turn, may be used by the perception module 204 to query the high-definition map and determine what agents 104 are expected to be in the environment.

In certain embodiments, perception module 204 may utilize the sensor data from one or more types of sensors and/or information derived therefrom to generate a representation of the contextual environment of the vehicle 102. For example, the representation of the external environment may include agents 104 such as other vehicles 102, curbs, debris, objects, and pedestrians. The contextual representation may be limited to a maximum range of the sensor array (e.g., 50 meters, 100 meters, or 200 meters) or may be supplemented by information obtained from other sensors in the environment, semantic information known about an area, and/or any other relevant information regardless of the range of the sensor array. The representation of the contextual environment may include information about the agents 104 or other objects within the environment that may be surrounding the vehicle 102, as well as semantic information about the traffic lanes, traffic rules, traffic signs, time of day, weather, and/or any other suitable information. The contextual environment may be represented in any suitable manner. For example, the contextual representation may be encoded as a vector or matrix of numerical values, with each value in the vector/matrix corresponding to a predetermined category of information. As will be further appreciated below with respect to FIGS. 3A and 5A, after a disengagement of the vehicle 102 is determined, perception data provided by the perception module 204 and/or sensor data provided by the sensor module 202 may be utilized to continuously capture data about a vehicle's environment after the driver disengages from autonomous-driving mode. The post-disengagement data about the vehicle's environment may be used to evaluate the vehicle's pre-disengagement planned trajectory by simulating the planned trajectory for the vehicle 102 in the observed environment to determine what might have occurred had the vehicle 102 continued operating in the autonomous-driving mode.

In certain embodiments, the representation of the present contextual environment from the perception module 204 may be consumed by a prediction module 206 to generate one or more predictions of the future environment. For example, given a representation of the contextual environment at time $T_0$, the prediction module 206 may output another contextual representation for time $T_1$. For instance, if the $T_0$ contextual environment may be represented by a raster image, the output of the prediction module 206 may be another raster image (e.g., a snapshot of the current environment) that depicts where the agents 104 would be at time $T_1$ (e.g., a snapshot of the predicted future). In certain embodiments, prediction module 206 may include a ML model that may be trained based on previously recorded contextual and sensor data. For example, one training sample may be generated based on a sequence of actual sensor data captured by the vehicle 102 at times $T_0$ and $T_1$. The captured data at times $T_0$ and $T_1$ may be used to generate, respectively, a first contextual representation (the training data) and a second contextual representation (the associated ground-truth used for training). During training, the ML model may process the first contextual representation using the model's current configuration parameters and output a predicted contextual representation. The predicted contextual representation may then be compared to the known second contextual representation (e.g., the ground-truth at time $T_1$).

In certain embodiments, the comparison may be quantified by a loss value, computed using a loss function. The loss value may be used (e.g., via back-propagation techniques) to update the configuration parameters of the ML model so that the loss would be less if the prediction were to be made again. The ML model may be trained iteratively using a large set of training samples until a convergence or termination condition is met. For example, training may terminate when the loss value is below a predetermined threshold. Once trained, the ML model may be used to generate predictions of future contextual representations based on current contextual representations. The prediction module 206 may utilize any combination of rule-based, ML-based, and/or mechanics models for characterizing the movement of agents 104 over time in order to predict the probabilities of different paths, types of movement, and actions over different time periods for use by the system to predict the movements of agents 104 surrounding the vehicle 102. As will be further appreciated below with respect to FIGS. 3B and 5B, after a driver disengages the vehicle from autonomous-driving mode, prediction data provided by the prediction module 206 may be utilized to evaluate the appropriateness of the disengagement. As will be described in further detail below, the evaluation may be performed by simulating the vehicle driving according to its pre-disengagement planned trajectory in a simulated environment defined by one or more predicted behavioral actions of one or more agents 104 within the environment. The simulation may be used to determine what might have occurred had the vehicle 102 continued operating in the autonomous-driving mode.

In certain embodiments, the planning module 208 may determine a planned trajectory for the vehicle 102, including navigation routes and particular driving operations (e.g., slowing down, speeding up, stopping, swerving, and so forth), based on the predicted contextual representation generated by the prediction module 206. In certain embodiments, the planning module 208 may utilize the predicted information encoded within the predicted contextual representation (e.g., predicted location or trajectory of agents 104, semantic data, and so forth) and any other available information (e.g., map data, scenario information, traffic data, accident reports, weather reports, target destinations, and any other suitable information) to determine one or more actions, goals, or navigation instructions for the vehicle 102 over a window of time (e.g., the planned trajectory may be for the next 2, 5, 10, or 15 seconds). For example, based on the predicted behavior of the agents 104 surrounding the vehicle and the traffic data to a particular destination, the planning module 208 may determine a particular navigation path and associated driving operations for the vehicle 102 over a window of time. The path may include a series of waypoints and/or any other suitable set of information for the vehicle 102 to understand the path of movement to following. The path and associated driving operations are generated to avoid possible collisions with one or more agents 104, to follow the rules of the road, and to ensure a safe and comfortable ride for the passengers of the vehicle 102.

In certain embodiments, planning module 208 may generate, based on a given predicted contextual representation, several different planned trajectories (e.g., paths, goals or navigation instructions) for the vehicle 102. For each plan, the planning module 208 may compute a score that represents the desirability of that plan. For example, if the plan would likely result in the vehicle 102 performing a hard stop or otherwise performing an uncomfortable or jarring movement the score for the plan may be penalized accordingly. Another plan that would cause the vehicle 102 to violate traffic rules or take a lengthy detour to avoid possible collisions may also have a score that is penalized, but the penalty may be less severe than the penalty applied. The penalties and scoring of the different potential routes may ensure safe and comfortable paths are generated and selected by the system. For example, a third plan that causes the vehicle 102 to gradually stop or change lanes to avoid an agent 104 in the predicted future may receive the highest score compared to paths with jarring movements and/or an increased chance of a collision event. Based on the assigned scores for the plans, the planning module 208 may select the best planned trajectory to carry out. While the example above used collision as an example, the disclosure herein contemplates the use of any suitable scoring criterial, such as travel distance or time, fuel economy, changes to the estimated time of arrival at the destination, passenger comfort, proximity to other vehicles, the confidence score associated with the predicted contextual representation, and so forth.

Based on the planned trajectory generated by planning module 208, which may include one or more navigation path or associated driving operations, the control module 210 may determine the specific commands to be issued to the actuators of the vehicle 102. The actuators of the vehicle 102 are components that are responsible for moving and controlling the vehicle 102. The actuators control driving functions of the vehicle 102, such as for example, steering, turn signals, throttle, deceleration (e.g., braking), acceleration, gear shift, and so forth. For example, control module 210 may transmit commands to a steering actuator to maintain a particular steering angle for a particular amount of time to move a vehicle on a particular trajectory. As another example, control module 210 may transmit commands to a throttle actuator to speed the vehicle 102 up or a braking actuator to slow the vehicle 102 down.

Figure 3A:
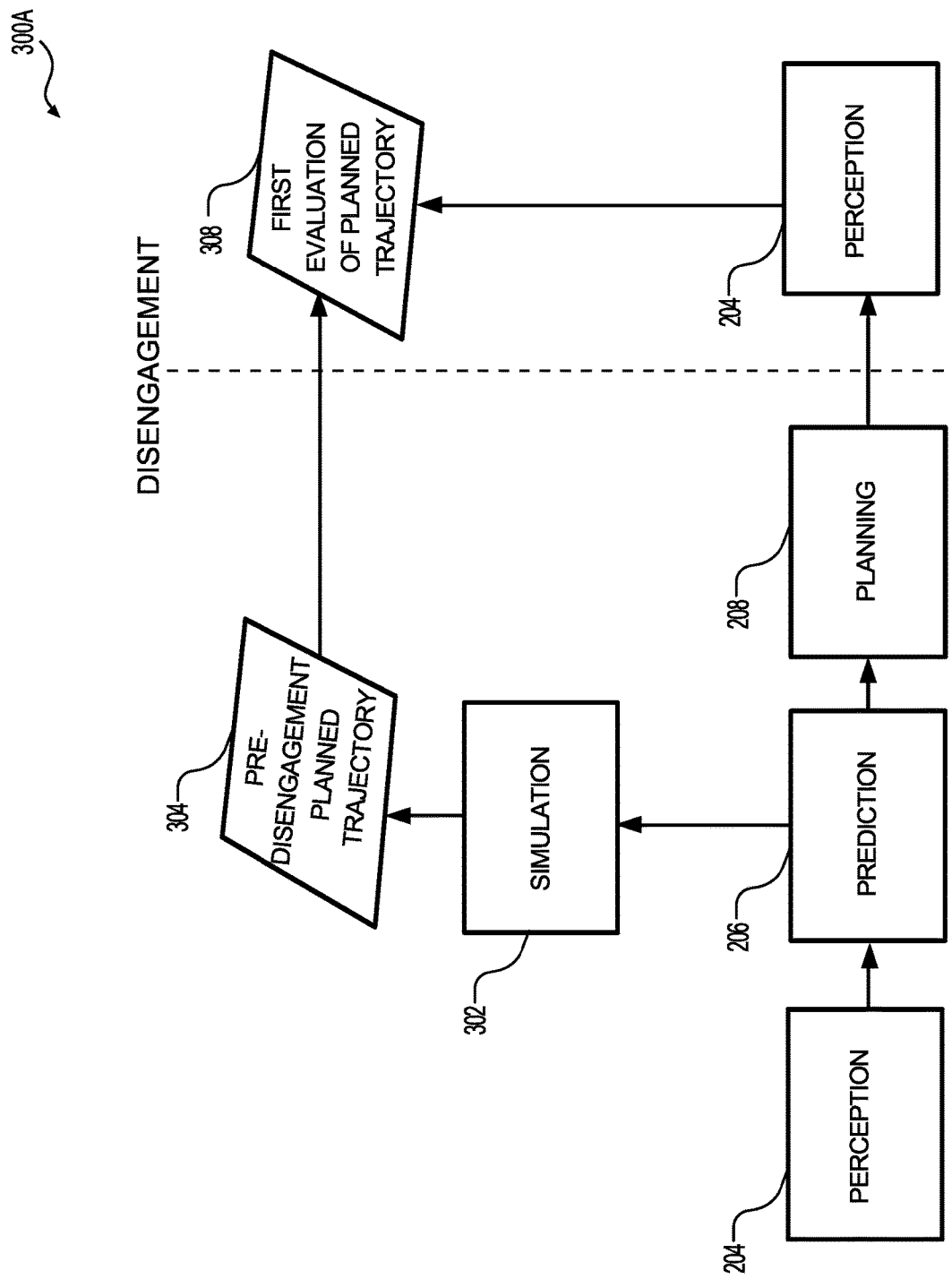
FIG. 3A illustrates an example block diagram of a compute system that may be useful in determining and evaluating disengagements in autonomous vehicles or semi-autonomous vehicles based on perception data.

FIG. 3A illustrates an example block diagram of a compute system 300A that may be used in determining and evaluating disengagements in autonomous vehicles or semi-autonomous vehicles based on perception data and providing actionable feedback to operations personnel (e.g., supervisory drivers, technicians, developers, and so forth), in accordance with the presently disclosed embodiments. As previously described with reference to FIG. 2, the vehicle 102 operating in autonomous-driving mode drives according to the planned trajectory generated by the planning module 208. The planned trajectory, which is generated based on predictions made by the prediction module 206, plans the future trajectory of the vehicle (e.g., the planned trajectory may specify how the vehicle should drive in the next 3, 5, or 10 seconds). While operating in autonomous-driving mode, the vehicle 102 would have a planned trajectory at any given moment. Thus, at the moment of disengagement, the vehicle 102 would have a planned trajectory that was generated before the time of disengagement. The disengagement may cause the system shown in FIG. 3A to be used to simulate and evaluate the appropriateness of the disengagement using the pre-disengagement planned trajectory of the vehicle.

FIG. 3A illustrates an embodiment where actual perceived data of the vehicle's environment is used to evaluate the disengagement. For example, as illustrated by FIG. 3A, an output of perception data generated by the perception module 204 may be provided as an input to a simulation model 302. In addition, the pre-disengagement planned trajectory 304 is provided as another input to the simulation model 302. Based on the inputs, the simulation model 302 may generate a simulation 302 representing a software simulation of a simulated vehicle driving according to the pre-disengagement planned trajectory 304 in a simulated contextual environment prescribed by the perception data from the perception module 204. For example, in one embodiment, simulations 302 generated by the simulation model 302 may represent the actual environment in which the vehicle 102 is operating post-disengagement, since the simulated environment is generated based on post-disengagement perception data. In another embodiment, the simulated environment may be generated based on augmented data in addition to actual perceived data from the perception module 204. For example, the simulations 302 generated by the simulation model 302 may represent the actual environment augmented with, for example, one or more predictions of agents 104 or other objects. For example, in certain embodiments, the simulations 302 generated by simulation model 302 may include virtual representations of the environment and one or more agents 104 present in the environment, including, for example, other vehicles, curbs, corners, debris, wildlife, vegetation, objects, or any of various other moving and/or stationary objects. Certain agents 104 whose behaviors are unlikely to be affected by the vehicle 102 disengaging from autonomous-driving model may be simulated using the perceived data from the perception module 204 (e.g., the behavior of another vehicle in front of vehicle 102 may not be affected by the vehicle 102's change in behavior, even if the driver of vehicle 102 stepped on the brakes). On the other hand, agents 104 whose behaviors are likely affected by the vehicle 102's behavior (e.g., another vehicle behind the vehicle 102 when the supervisor driver applies the brakes) may instead be simulated using predicted data, since the actual perceived data of those agents 104 may not reliably reflect what those agents would have done had the vehicle not disengaged from autonomous-driving mode.

Figure 3B:
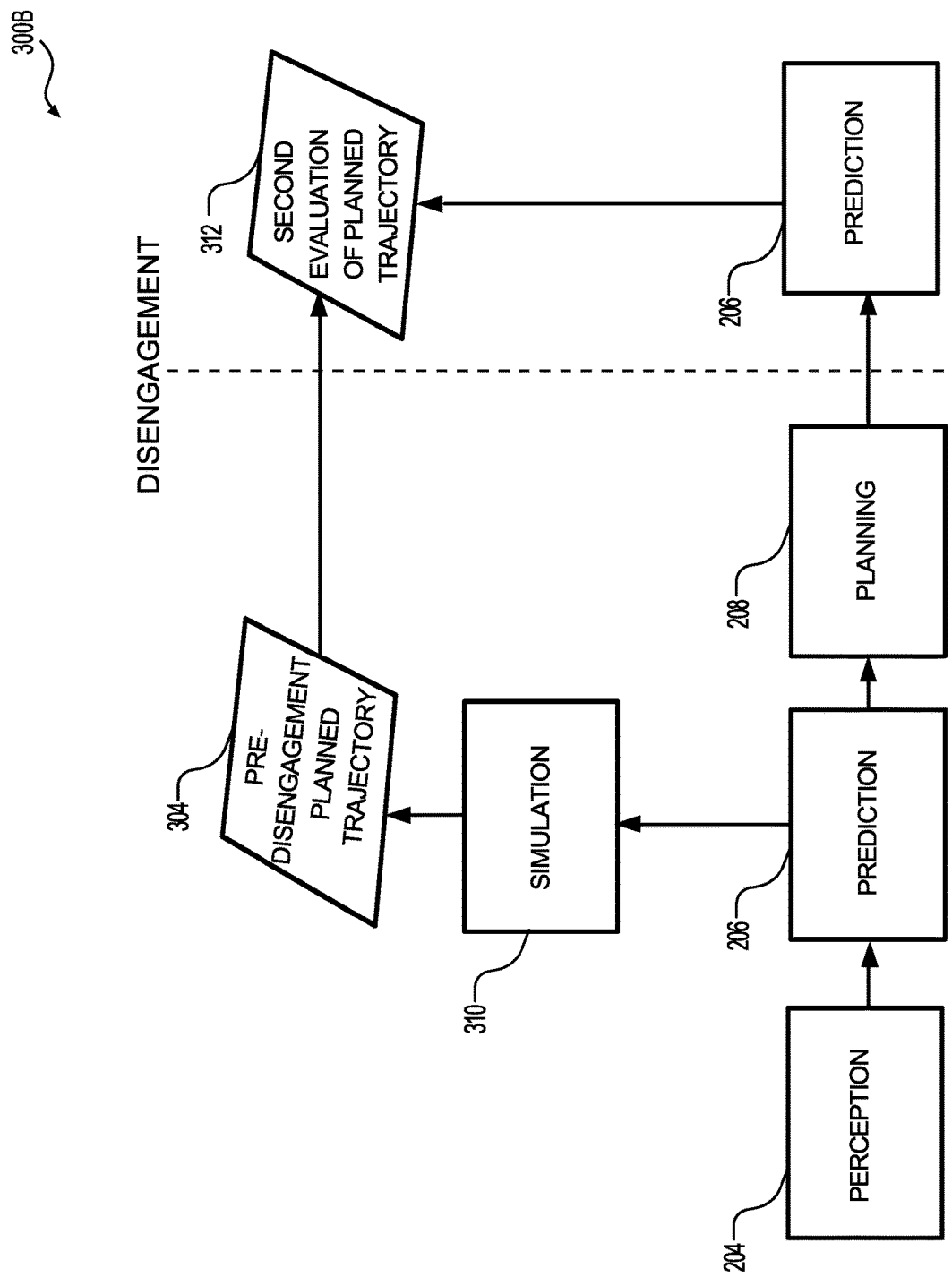
FIG. 3B illustrates an example block diagram of a compute system that may be useful in determining and evaluating disengagements in autonomous vehicles or semi-autonomous vehicles based on prediction data.

FIG. 3B illustrates an example block diagram of a compute system 300B that may be used in determining and evaluating disengagements in autonomous vehicles or semi-autonomous vehicles based on prediction data and perception data and providing actionable feedback to operations personnel (e.g., supervisory drivers, technicians, developers, and so forth), in accordance with the presently disclosed embodiments. For example, as illustrated by FIG. 3B, the simulation model 302 may take as input the pre-disengagement planned trajectory 304. In addition, the simulation model may further take as input prediction data generated by the prediction module 206. In certain embodiments, the simulation model 302 may generate data describing a simulated contextual environment of the vehicle 102. For example, in one embodiment, simulations generated by the simulation model 302 data may represent the actual environment, which may be augmented, for example, by one or more predictions of agents 104 or other objects. It should be appreciated that this one or more predictions of agents 104 behavior may be based on, for example, perception data generated pre-disengagement and perception data generated post-disengagement. For example, in certain embodiments, the simulations generated by simulation model 302 may include virtual representations of the environment and one or more agents 104 present in the environment, including, for example, other vehicles 102, static map elements (e.g., curbs, corners, traffic lights, etc.), and moving and/or stationary objects.

In certain embodiments, as further depicted by the compute system 300B, in addition to the input of prediction data received from the prediction module 206, the simulation model 302 may also receive as an input a pre-disengagement planned trajectory 304 of the vehicle 102. For example, in some embodiments, the prediction data received from the prediction module 206 may include, for example, predicted behavior or movements of one or more agents 104 within the environment surrounding the vehicle 102 (e.g., simulated for 10-20 seconds after the disengagement occurred). In certain embodiments, after a disengagement (e.g., switch from operating in the autonomous-driving mode to operating in the operator-driving mode) is determined as having occurred, the simulation model 302 may generate a second simulations 310 to perform a second evaluation of the pre-disengagement planned trajectory 312 of the vehicle 102 against post-disengagement prediction data. For example, as will be further illustrated and delineated with respect to FIG. 5B, the pre-disengagement planned trajectory 304 may be evaluated against predicted agent 104 behaviors or movements simulated subsequent to the disengagement. For example, the predicted behaviors or movements of one or more agents 104 within the environment may be simulated utilizing prediction data received from the prediction module 206, and the planned trajectory of the vehicle 102 may be simulated to ascertain the manner in which the vehicle 102 would have proceeded with respect to the predicted agent 104 behaviors or movements had the vehicle 102 continued operating in the autonomous-driving mode (e.g., a recreation of a presumptive driving scenario—based on the pre-disengagement planned trajectory 304 of the vehicle 102 and predicted prediction data—absent any disengagement event).

In certain embodiments, the first evaluation 308 generated by the first simulations 302 or the second evaluation 312 generated by the second simulations 310 may include an evaluation of whether a particular disengagement was appropriate (e.g., due to a temporary misoperation or less than optimal operation of one or more systems or subsystems of the vehicle 102) or inappropriate (e.g., due to an overly cautious or overzealous supervisory driver of the vehicle 102 that disengaged prematurely) and generated actionable feedback based thereon (e.g., generated in real-time or near real-time). For example, in certain embodiments, the first evaluation 308 generated by the first simulations 302 or the second evaluation 312 generated by the second simulations 310 may determine whether or not a particular disengagement was appropriate by simulating a recreation of what would have happened had the vehicle 102 continued in the autonomous-driving mode in accordance with the pre-disengagement planned trajectory 304 and with respect to one or more agents 104 behavior or movements perceived or predicted within the environment.

In some embodiments, the first evaluation 308 generated by the first simulations 302 or the second evaluation 312 generated by the second simulations 310 may include, for example, evaluations of whether a potentially hazardous condition (e.g., a collision) were to occur had the vehicle 102 continued operating in the autonomous-driving mode and the severity of that potentially hazardous condition. For example, in one embodiment, if the first evaluation 308 generated by the first simulations 302 or the second evaluation 312 generated by the second simulations 310 reveals that the vehicle 102 were to collide with an agent 104, the first evaluation 308 generated by the first simulations 302 or the second evaluation 312 generated by the second simulations 310 may evaluate and assess the preceding disengagement as having been appropriate. Similarly, in another embodiment, if the first evaluation 308 generated by the first simulations 302 or the second evaluation 312 generated by the second simulations 310 reveals that the vehicle 102 were not to collide with an agent 104, but instead were to result in an instance in which the vehicle 102 would have stopped too closely to one or more agents 104 (e.g., such that a pedestrian, a bicyclist, other agent, or the supervisory driver would have reasonably become alarmed: a "too-close-for-comfort" instance), the first evaluation 308 generated by the first simulations 302 or the second evaluation 312 generated by the second simulations 310 may evaluate and assess the preceding disengagement as having been moderately appropriate.

In other embodiments, if the first evaluation 308 generated by the first simulations 302 or the second evaluation 312 generated by the second simulations 310 reveals that the vehicle 102 were not to result in any potentially hazardous condition (e.g., a collision) with respect to any agent 104, but the vehicle 102 was determined to have been operating within a special safety zone (e.g., a school zone, a park, a parking lot, a crossway, a particular urban district crowed with pedestrians, and so forth), the first evaluation 308 generated by the first simulations 302 or the second evaluation 312 generated by the second simulations 310 may evaluate and assess the preceding disengagement as having been moderately inappropriate. In another embodiment, if the first evaluation 308 generated by the first simulations 302 or the second evaluation 312 generated by the second simulations 310 reveals that the vehicle 102 were not to encounter a potentially hazardous conditions with respect to any agent 104 or with respect to any special safety zones, for example, the first evaluation 308 generated by the first simulations 302 or the second evaluation 312 generated by the second simulations 310 may evaluate and assess the preceding disengagement as having been inappropriate. Specifically, such an instance of disengagement may be evaluated and assessed as having been the result of, for example, the supervisory driver having become overzealous and disengaged prematurely (e.g., indicating that the supervisory driver is to receive actionable feedback to train the supervisory driver to disengage more judiciously). The forgoing driving scenarios are included merely for the purposes of example, as will be further described below, the first simulations 302 or the second simulations 310 may include any of various simulated driving scenarios that may be evaluated and assessed.

In certain embodiments, the first evaluation 308 and/or the second evaluation 312 may indicate whether a potentially hazardous condition were to occur had the vehicle 102 continued operating in the autonomous-driving mode and in accordance with the pre-disengagement planned trajectory 304. For example, the first evaluation 308 and/or the second evaluation 312 may reveal whether a collision between the vehicle 102 and one or more agents 104 were to occur, whether the vehicle 102 would have stopped too closely to one or more agents 104 (e.g., such that a pedestrian, a bicyclist, other agent, or the supervisory driver would have reasonably become alarmed: a "too-close-for-comfort" instance), whether the vehicle 102 would have slowed its velocity to 20 miles per hour (mph) or less entering into a school zone, or whether one or more other potentially hazardous conditions were to occur had the vehicle 102 continued operating in the autonomous-driving mode and in accordance with the pre-disengagement planned trajectory 304.

In some embodiments, if the first evaluation 308 generated by the first simulation model 302 or the second evaluation 312 generated by the second simulation model 310 yields that a potentially hazardous condition were to occur had the vehicle 102 continued operating in the autonomous-driving mode and in accordance with the pre-disengagement planned trajectory 304, the first evaluation 308 or the second evaluation 312 may further include a degree of severity of the potentially hazardous condition. For example, if a collision between the vehicle 102 and one or more agents 104 occurred in simulation, the first evaluation 308 or the second evaluation 312 may indicate that the disengagement was appropriate and that a highest degree of severity should be raised. The assigned high severity level may trigger an appropriate event, such as sending an urgent notification to the supervisor driver, the fleet management system, the developers of the autonomous-driving system, and any other stakeholders. As another example, if no collision occurred in simulation but the simulated vehicle stopped overly close to the one or more agents 104 (e.g., the simulated vehicle stopped within a predetermined threshold distance from the agent, such as 1, 2, or 3 feet), the first evaluation 308 or second evaluation 312 may indicate that the disengagement was appropriate and assign a relatively lower degree of severity to the disengagement incident. As yet another example, if no collision occurred in simulation because the simulated vehicle stopped well in advance of the one or more agents 104, the first evaluation 308 or second evaluation 312 may indicate that the disengagement was inappropriate and assign a lowest degree of severity to the disengagement incident. In some embodiments, the degree of severity of a potentially hazardous condition may be determined based on, for example, a continuous scale defined by the highest degree of severity (e.g., a collision or a "too-close-for-comfort" stop) and the lowest degree of severity (e.g., a safely executed stop or other safely executed driving maneuver). In another embodiment, the degree of severity of a potentially hazardous condition may be determined to be high or low based on, for example, a predetermined acceptable threshold for the degree of severity of a potentially hazardous condition.

In certain embodiments, based on the degree of severity of the potentially hazardous condition, the first evaluation 308 generated by the first simulation model 302 or the second evaluation 312 generated by the second simulation model 310 may also assign a priority to the potentially hazardous condition. For example, in one embodiment, if the degree of severity of the potentially hazardous condition is determined to be higher than a predetermined acceptable threshold, the particular disengagement event may be assigned a high priority and any systems or subsystems of the vehicle 102 determined to have temporarily misoperated (e.g., which led to the disengagement event) may be flagged and assigned a high priority for troubleshooting by developers, maintenance by one or more service technicians, automatic updating, unemployment of the vehicle 102 from an employed fleet of vehicles 102, and so forth (e.g., in real-time or near real-time). In another embodiment, if the degree of severity of the potentially hazardous condition is determined to be lower than the predetermined acceptable threshold, the particular disengagement event may be assigned a low priority for later investigation (e.g., after the vehicle is taken offline).

In certain embodiments, the first evaluation 308, the second evaluation 312, or both, may further include actionable feedback based on whether a particular disengagement is determined to be appropriate or inappropriate. For example, in some embodiments, the actionable feedback may include, for example, one or more notifications including a message of whether the disengagement is appropriate or inappropriate to train the supervisory driver of the vehicle 102 to disengage more judiciously. In another embodiment, as previously noted, the actionable feedback may include, for example, one or more notifications of an operation health (and degree of severity) of one or more systems or subsystems of the vehicle 102 that may be provided to a cloud-based service or fog-based service to perform troubleshooting, updating, system shutdown, or other protocol to maximize safety and operational efficiency and efficacy of the vehicle 102.

Figure 4:
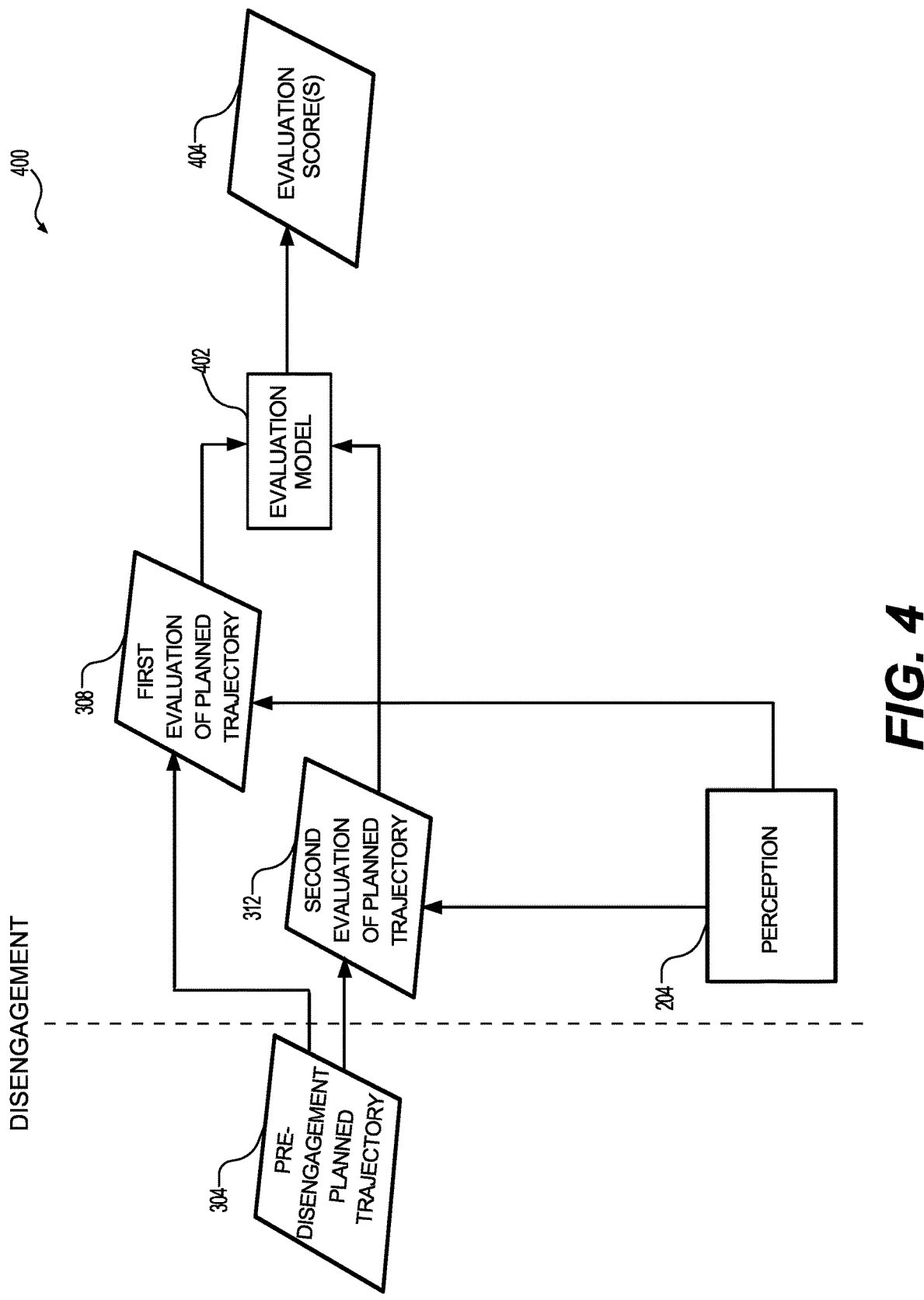
FIG. 4 illustrates compute system that may be utilized to generate evaluation scores based on the first evaluation and the second evaluation

FIG. 4 illustrates compute system 400 that may be utilized to generate evaluation scores based on the first evaluation and the second evaluation. For example, in certain embodiments, the first evaluation 308 generated by the first simulation model 302 and/or the second evaluation 312 generated by the second simulation model 310 may be utilized by an evaluation model 402 to generate a confidence score or an evaluation score 404 with respect to a particular disengagement. In some embodiments, the embodiments shown in FIGS. 3A and 3B may be used independently to evaluate the appropriateness of a disengagement. In other embodiments, both embodiments may be used to evaluate the appropriateness of a disengagement. For example, in some embodiments, the first evaluation 308 and the second evaluation 312 may be scored or weighted (e.g., probabilities) by the evaluation model 402, for example, such that the first evaluation 308 generated by the first simulation model 302 based on perception data and/or sensor data may include a higher confidence score than the second evaluation 312 generated by the second simulation model 310 based on prediction data. For example, because the first evaluation 308 generated by the first simulation model 302 may be based on, for example, the actual agent 104 behaviors or movements within the environment while the second evaluation 312 generated by the second simulation model 310 may be based on, for example, predicted agent 104 behaviors or movements, the first evaluation 308 based on perception data and/or sensor data may be determined as having a higher confidence or probability of being accurate.

In certain embodiments, in the first few seconds after disengagement (e.g., within 1 or 2 seconds), actual behavior of the agents 104 may be unlikely to be significantly influenced by post-disengagement actions of the vehicle 102. Since the small window of post-disengagement perception data may be unlikely to be tainted by the vehicle's 102 post-disengagement actions and is more up-to-date than pre-disengagement perception data, it may serve as a more reliable source of information for the prediction module 206 to predict a contextual environment in which the vehicle 102 had not disengaged. During simulation, behaviors or movements of one or more agents 104 within the environment may be simulated based on the prediction data, and movements of the vehicle 102 may be simulated using the pre-disengagement planned trajectory. The simulation would indicate what would have likely occurred had the vehicle 102 continued operating in the autonomous-driving mode (e.g., the simulation generates a recreation of a presumptive driving scenario—based on the planned trajectory of the vehicle 102 and predicted data—absent any disengagement event).

In certain embodiments, the evaluation score 404 generated by the evaluation model 402 may represent an appropriateness of the disengagement. In one embodiment, the respective confidence scores or weights may be based on which of the first simulation evaluation 308 and the second simulation model 312 includes the lesser (e.g., approximately 1-5 seconds as opposed to approximately 5-10 seconds or 10-15 seconds) of an estimated time to collision (TTC), for example, indicating that the vehicle 102 would have potentially collided with an agent 104 had the supervisory driver not engaged from the autonomous-driving mode. Specifically, in some embodiments, whichever of the first evaluation 308 and the second evaluation 312 is indicated by the evaluation model 402, for example, that the vehicle 102 would have potentially contacted and/or collided with an agent 104 within, for example, the first 1-5 seconds of the supervisory driver disengaging the vehicle 102 from the autonomous-driving mode may be scored or weighted the highest. For example, the second evaluation 312 may indicate that the vehicle 102 would have potentially contacted and/or collided with the predicted agent 104 within a TTC of approximately 1-5 seconds based on the predicted data. Similarly, the first evaluation 308 may indicate that the vehicle 102 would have potentially contacted and/or collided with the agent 104 within a TTC of approximately 5-10 seconds based on the perceived data. In such a case, the evaluation model 402 may compare the second evaluation 312 against the first evaluation 308, and, because the first evaluation 308 indicates that the vehicle 102 would have potentially contacted and/or collided with the perceived agent 104 5-10 seconds after disengagement, the first evaluation 308 may be assigned a lower score or weight than the higher score or weight assigned to the second evaluation 312. In one embodiment, based on one or more of the above variance in evaluation scores 404 between the first evaluation 308 and the second evaluation 312, the compute system 400 may also include a selector to determine the relevant vehicle data to be fed back to, for example, the simulation model 302 and the simulation model 310 for training.

Figure 5A:
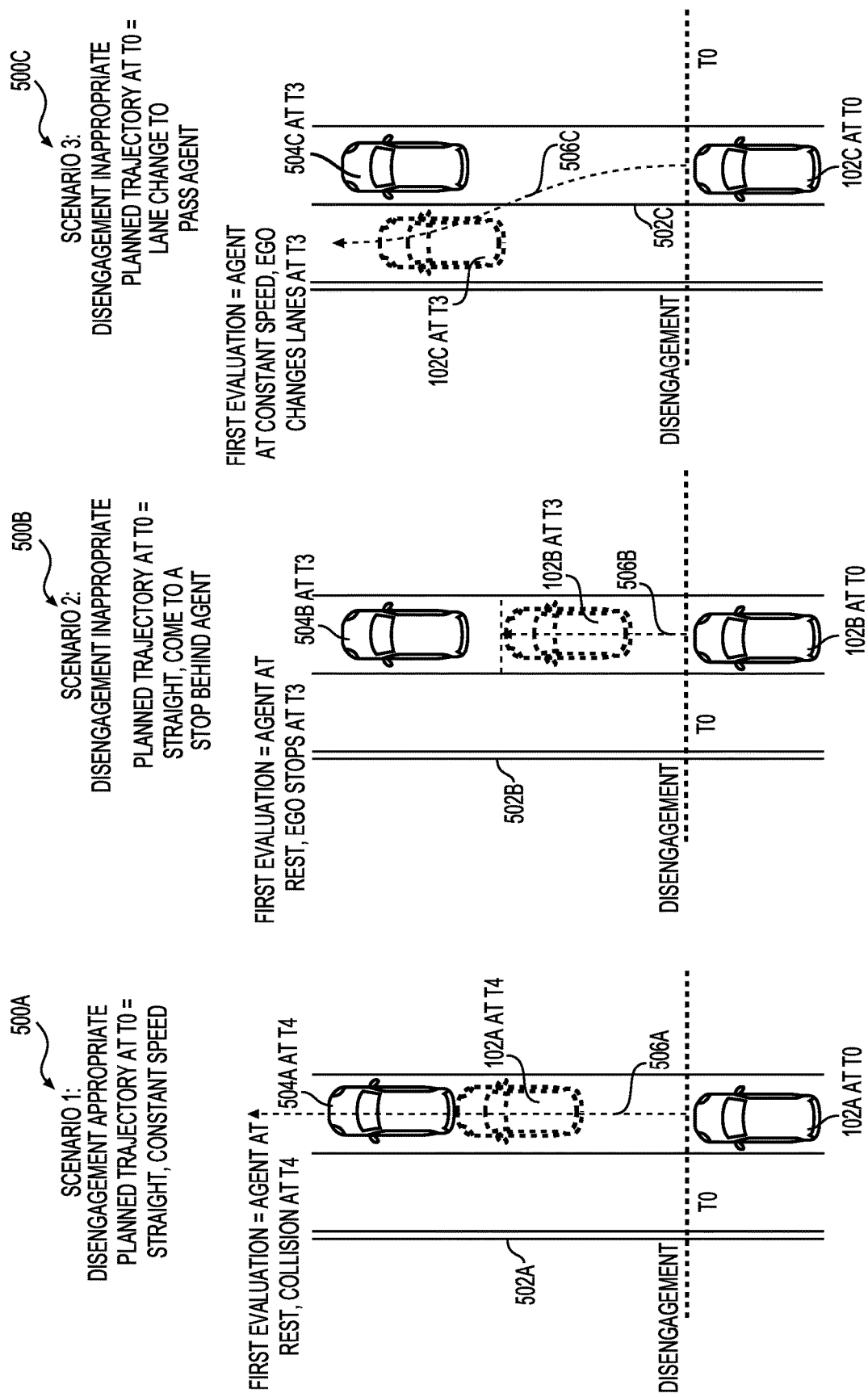
FIG. 5A illustrates one or more running examples of autonomous-driving mode scenarios for determining and evaluating disengagements in autonomous vehicles or semi-autonomous vehicles based on perception data.

FIG. 5A illustrates one or more running examples of autonomous-driving mode scenarios 500A, 500B, and 500C for determining and evaluating disengagements in autonomous vehicles or semi-autonomous vehicles based on perception data and prediction data and providing actionable feedback to operations personnel (e.g., supervisory drivers, technicians, developers, and so forth), in accordance with the presently disclosed embodiments. Indeed, while the running examples provided by FIGS. 5A and 5B may be discussed henceforth primarily with respect to agents 104 represented as other vehicles, it should be appreciated that the independent trajectory validation techniques as presently disclosed herein may be applied in response to any of various detectable environmental conditions, such as objects (e.g., other vehicles, pedestrians, bicyclists, wildlife, vegetation, or any of various other moving and/or stationary objects) present within the environment, various weather and/or road conditions (e.g., wet road conditions, iced road conditions, road inclines, road declines, vehicle visibility range, and so forth), road and traffic communications (e.g., traffic lights, traffic signs, lane markings, lane boundaries, detours, school zones, railroad crossings, and so forth), among various other agents 104 that may be present within the environment.

In certain embodiments, as illustrated by the one or more running example driving scenarios 500A, 500B, and 500C, a disengagement (e.g., disengaging the vehicles 102A, 102B, and 102C from operating in the autonomous-driving mode to operating in the operator-driving mode) may occur at a given point in time ($T_0$) while the respective vehicles 102A, 102B, and 102C (referred to as the ego vehicle in the figures to distinguish them from the agents) are operating within the autonomous-driving mode. It should be appreciated that simulations of the running examples of autonomous-driving mode scenarios 500A, 500B, and 500C are performed for a time period after the point of disengagement (e.g., the simulated time period may correspond to the time period of the pre-disengagement planned trajectory). Vehicles 102A, 102B, and 102C are simulated according to their respective pre-disengagement planned trajectories 506A, 506B, and 506C (e.g., as illustrated by the dashed lines of the pre-disengagement planned trajectories 506A, 506B, and 506C). The behaviors or movements of the other vehicles 504A, 504B, and 504C may be simulated based on the actual behaviors or movements perceived subsequent to the respective disengagements (e.g., as illustrated by the solid lines of the other vehicles 504A, 504B, and 504C).

For example, in the example autonomous-driving mode scenario 500A, a disengagement may occur at a time $T_0$ at which time the vehicle 102A is approaching, for example, another vehicle 504A at rest. The scenario 500A shows where the simulated ego vehicle 102A and another vehicle (or agent vehicle) 504A would be located at time T4. In this example, the pre-disengagement planned trajectory 506A for the vehicle 102A may include a constant velocity and constant steering angle, such that the vehicle 102A may continue driving straight on the roadway 502A (e.g., without stopping). In this case, a supervisory driver of the vehicle 102A may have disengaged because the supervisory driver may have surmised a potential collision between the vehicle 102A and the other vehicle 504A. In certain embodiments, after the disengagement occurs at time $T_0$, a first simulation 302 may be generated, as described with reference to FIG. 3A. The illustrated scenario 500A may represent a snapshot of the first simulation 302 at time $T_4$. In the first simulation 302, the spatial location of the vehicle 102A may be determined according to the pre-disengagement planned trajectory 304. As such, the first simulation 302 would know where the vehicle 102A would likely be at various times (e.g., at time $T_4$) had it continued operating in autonomous-driving mode. The location of the other vehicle 504A may be determined based on actually perceived data. For example, after $T_0$, the real vehicle 102A (i.e., not the simulated vehicle) may continue to capture sensor data of its environment. The sensor data captured at time $T_4$ may be used to determine the actual location of the other vehicle 540A at time $T_4$. As shown in scenario 500A, had the vehicle 102A continued operating in the autonomous-driving mode and in accordance with the pre-disengagement planned trajectory 506A, a collision between the vehicle 102A and the other vehicle 504A would have occurred at time $T_4$. Thus, the first evaluation 308 may determine the disengagement as being appropriate. In such a case, the actionable feedback triggered by the disengagement evaluation may include, for example, one or more notifications of an operation health (and degree of severity) of one or more systems of the vehicle 102A that may be provided to a cloud-based service or fog-based service to perform troubleshooting, updating, system shutdown, or other protocol to maximize safety and operational efficiency and efficacy of the vehicle 102A or other vehicles of a deployed fleet of vehicles 102A.

In certain embodiments, in the example autonomous-driving mode scenario 500B, a disengagement may occur at a time $T_0$ at which time the vehicle 102B is approaching, for example, another vehicle 504B at rest. In certain embodiments, the pre-disengagement planned trajectory 506B for the vehicle 102B may include a decreasing velocity and constant steering angle, such that the vehicle 102B may continue driving straight and stopping along the roadway 502B at a time $T_3$. In this case, a supervisory driver of the vehicle 102A may have disengaged because the supervisory driver may have surmised a potential collision between the vehicle 102B and the other vehicle 504B. In certain embodiments, after the disengagement at time $T_0$, the simulation model 302 may generate a first simulation 302. A snapshot of the simulation at time $T_3$ is illustrated. According to the simulation, had the vehicle 102B continued operating in the autonomous-driving mode and in accordance with the pre-disengagement planned trajectory 506B, the vehicle 102B would have stopped well short of the other vehicle 50B at time $T_3$ and no collision between the vehicle 102B and the other vehicle 504B would have occurred. Thus, the first evaluation 308 generated based on the first simulation model 302 may determine the disengagement as being inappropriate (e.g., the supervisory driver of the vehicle 102B unnecessarily disengaged). In such a case, the actionable feedback triggered by the disengagement evaluation may include, for example, one or more notifications indicating that the disengagement as is inappropriate in order to train the supervisory driver of the vehicle 102B to disengage more consistently or judiciously (e.g., in the context of the autonomous driving scenario 500B or similarly related driving scenario).

In certain embodiments, in the example autonomous-driving mode scenario 500C, a disengagement may occur at a time $T_0$ at which time the vehicle 102C is approaching, for example, another vehicle 504C moving traveling at constant velocity on the roadway 502C and in the same lane as the vehicle 102C. In certain embodiments, the pre-disengagement planned trajectory 506C for the vehicle 102C may include a constant velocity (e.g., greater than the constant velocity of the other vehicle 504C) and a varying steering angle, such that the vehicle 102C may continue driving straight and ultimately changing lanes on the roadway 502C to avoid the other vehicle 504C. In this case, a supervisory driver of the vehicle 102A may have disengaged because the supervisory driver may have surmised that, based on the current trajectory and relative velocity between the vehicle 102C and the other vehicle 504C, a potential collision between the vehicle 102C and the other vehicle 504C would occur. In certain embodiments, after the disengagement at time $T_0$, the simulation model 302 may generate a first simulation 302. A snapshot of the simulation at time $T_3$ is illustrated. According to the simulation, had the vehicle 102C continued operating in the autonomous-driving mode and in accordance with the pre-disengagement planned trajectory 506C, the vehicle 102C would have safely changed lanes at a time $T_3$ and safely passed the other vehicle 504C thereafter. Thus, no collision between the vehicle 102C and the other vehicle 504C would have occurred. In such a case, the first evaluation 308 generated based on the first simulation model 302 may determine the disengagement as being inappropriate (e.g., the supervisory driver of the vehicle 102C became overzealous and prematurely disengaged). In such a case, the actionable feedback triggered by the disengagement evaluation may include, for example, one or more notifications indicating that the disengagement is inappropriate in order to train the supervisory driver of the vehicle 102C to disengage more consistently or judiciously (e.g., in the context of the autonomous driving scenario 500C or similarly related driving scenario).

Figure 5B:
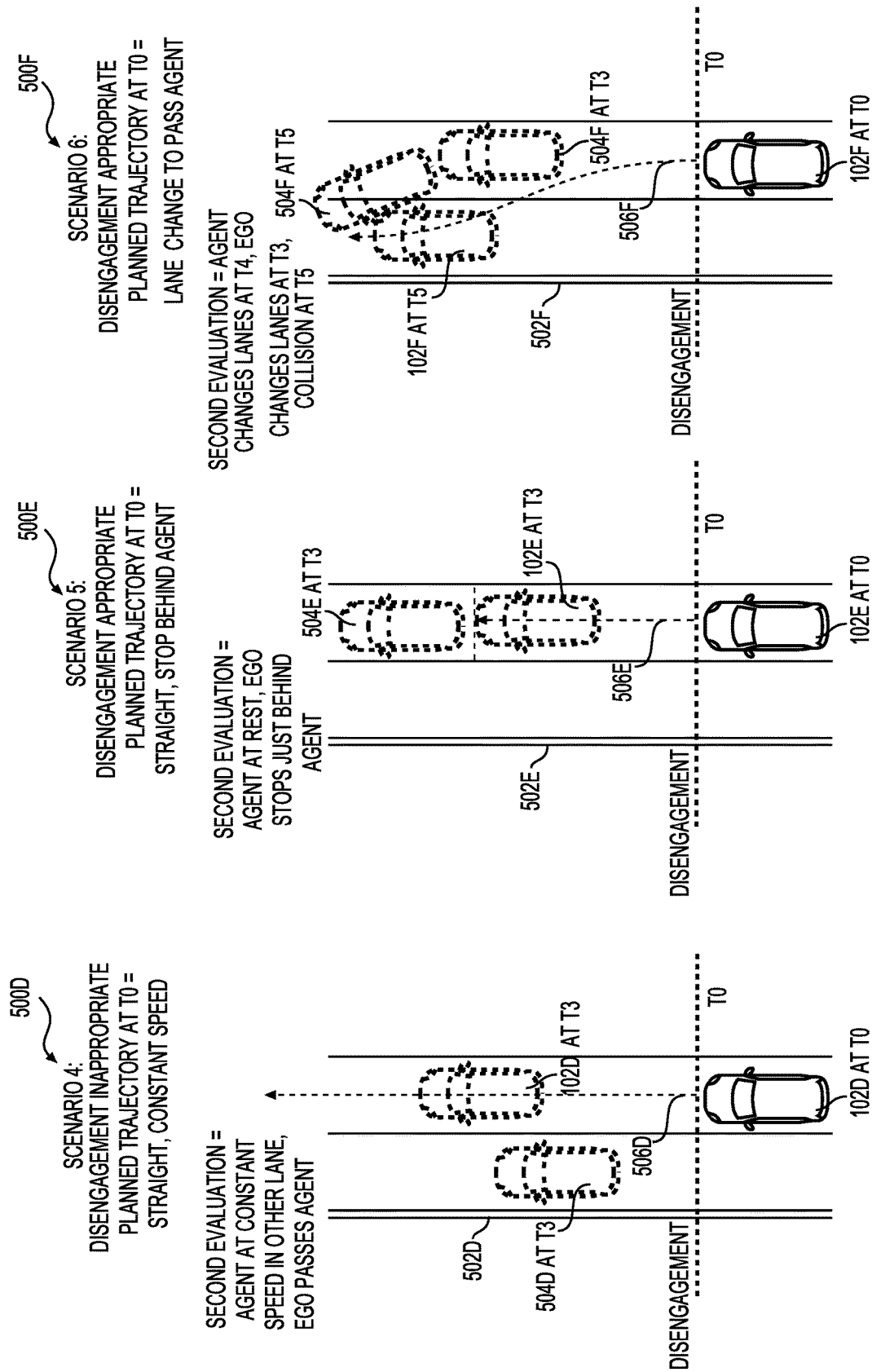
FIG. 5B illustrates one or more running examples of autonomous-driving mode scenarios for determining and evaluating disengagements in autonomous vehicles or semi-autonomous vehicles based on prediction data.

FIG. 5B illustrates one or more running examples of autonomous-driving mode scenarios 500D, 500E, and 500F for determining and evaluating disengagements in autonomous vehicles or semi-autonomous vehicles based on perception data and prediction data and providing actionable feedback to operations personnel (e.g., supervisory drivers, technicians, developers, and so forth), in accordance with the presently disclosed embodiments. It should be appreciated that the simulations of the running examples of autonomous-driving mode scenarios 500D, 500E, and 500F are performed for a time period after the point of disengagement (e.g., the simulated time period may correspond to the time period of the pre-disengagement planned trajectory). Vehicles 102D, 102E, and 102F are simulated according to their respective pre-disengagement planned trajectories 506D, 506E, and 506F. The other vehicles 504D, 504E, and 504F may be simulated based on the predicted behaviors or movements of the other vehicles predicted subsequent to the respective disengagements (e.g., as illustrated by the dashed lines of the other vehicles 504D, 504E, and 504F).

In certain embodiments, in the example autonomous-driving mode scenario 500D, a disengagement may occur at a time $T_0$ at which time the vehicle 102D is starting to pass, for example, another vehicle 504D traveling in a lane next to the vehicle 102D along the roadway 502D. In certain embodiments, the pre-disengagement planned trajectory 506D for the vehicle 102D may include a constant velocity and constant steering angle, such that the vehicle 102D may continue driving straight along the roadway 502D over a period of time. In this case, a supervisory driver of the vehicle 102D may have disengaged because the supervisory driver may have believed, before time $T_0$, that the vehicle 504D would attempt to change lanes immediately because the other vehicle 504D may have suddenly turned on a turning signal. In certain embodiments, after the disengagement occurs at time $T_0$, the simulation model 302 may perform a simulation 310 of what would have occurred had the driver not disengaged. The illustrated scenario 500D represents a snapshot of the simulation at time $T_3$. According to the simulation 310, had the vehicle 102D continued operating in the autonomous-driving mode and in accordance with the pre-disengagement planned trajectory 506D, the vehicle 102D would have continued traveling in its lane at a constant velocity and would have begun to pass the other vehicle 504D at time $T_3$. Based on the predicted data generated by the prediction module 206, the other vehicle 504D would not have veered into the lane of the vehicle 102D and would have continued straight and at a constant velocity in its lane while the vehicle 102D safely passed. According to the simulation 310, no collision would have occurred. Thus, the second evaluation 312 generated based on the second simulation 310 may determine the disengagement as being inappropriate (e.g., the supervisory driver of the vehicle 102D overzealously and prematurely disengaged). In such a case, the actionable feedback triggered by the disengagement evaluation may include, for example, one or more notifications indicating that the disengagement is inappropriate in order to train the supervisory driver of the vehicle 102D to disengage more consistently or judiciously (e.g., in the context of the autonomous driving scenario 500D or similarly related driving scenario).

In certain embodiments, in the example autonomous-driving mode scenario 500E, a disengagement may occur at a time $T_0$ at which time the vehicle 102E is approaching, for example, another vehicle 504E at rest. In certain embodiments, the pre-disengagement planned trajectory 506E for the vehicle 102E may include a decreasing velocity and constant steering angle, such that the vehicle 102E may continue driving straight along the roadway 502E and stopping just short (e.g., within only a few feet) of the other vehicle 504E at a time $T_3$. In this case, a supervisory driver of the vehicle 102E may have disengaged because the supervisory driver may have surmised, based on the velocity and trajectory of the vehicle 102E before time $T_0$, a potential collision between the vehicle 102E and the other vehicle 504E. In certain embodiments, after the disengagement occurs at time $T_0$, the simulation model 302 may perform a simulation 310 of what would have occurred had the driver not disengaged. The illustrated scenario 500E represents a snapshot of the simulation at time $T_3$. According to the simulation 310, at time $T_3$, the other vehicle 504E would likely remain stationary (as predicted by the prediction module 206). Moreover, had the vehicle 102E continued operating in the autonomous-driving mode and in accordance with the pre-disengagement planned trajectory 506E, the vehicle 102E would have indeed stopped just short (e.g., within only a few feet) of the other vehicle 504E at time $T_3$. Although no collision between the vehicle 102E and the other vehicle 504E would have occurred, because the vehicle 102E stops only just short (e.g., within only a few feet) of the other vehicle 504E, the second evaluation 312 generated based on the second simulation 310 may determine the disengagement as being appropriate (e.g., due to temporary misoperation or less than optimal operation of one or more systems or subsystems of the vehicle 102E). In such a case, the actionable feedback triggered by the disengagement evaluation may include, for example, one or more notifications of an operation health (and degree of severity) of one or more systems of the vehicle 102E that may be provided to a cloud-based service or fog-based service to perform troubleshooting and updating. For example, because the pre-disengagement planned trajectory 506E would have not resulted in a collision, the disengagement may be flagged and stored for developer updates at a later time, for example.

In certain embodiments, in the example autonomous-driving mode scenario 500F, a disengagement may occur at a time $T_0$ at which time the vehicle 102F is approaching, for example, another vehicle 504F traveling on the roadway 502F and in the same lane as the vehicle 102F. In certain embodiments, the pre-disengagement planned trajectory 506F for the vehicle 102F may include a constant velocity (e.g., greater than the constant velocity of the other vehicle 504F) and a varying steering angle, such that the vehicle 102F may continue driving straight along the roadway 502F and ultimately change lanes from the right lane to the left lane. In this case, a supervisory driver of the vehicle 102F may have disengaged because the supervisory driver may have surmised that the other vehicle 504F appeared to be driving erratically and, therefore, did not want the vehicle 102F to get too close to the other vehicle 504F. In certain embodiments, after the disengagement occurs at time $T_0$, the simulation model 302 may generate a simulation 310 based on the pre-disengagement planned trajectory 506F and the predicted behavior of the other vehicle 504F. According to the simulation 310, had the vehicle 102F continued operating in the autonomous-driving mode and in accordance with the pre-disengagement planned trajectory 506F, the vehicle 102F would have safely changed lanes at a time $T_3$. However, the prediction module 206 may predict that at time $T_5$, the other vehicle 504F would have veered recklessly into the left lane of the vehicle 102F. Thus, according to the simulation 310, a collision is like to occur between the vehicle 102F and the other vehicle 504F at a time $T_5$. In such a case, the second evaluation 312 generated based on the second simulation model 310 may determine the disengagement as being appropriate (e.g., the supervisory driver of the vehicle 102F maximized safety, even though there was no temporary misoperation or less than optimal operation any of the systems or subsystems of the vehicle 102F). In such a case, the actionable feedback triggered by the disengagement evaluation may include, for example, one or more notifications indicating that the disengagement is appropriate in order to provide positive reinforcement training to the supervisory driver of the vehicle 102F.

Figure 6A:
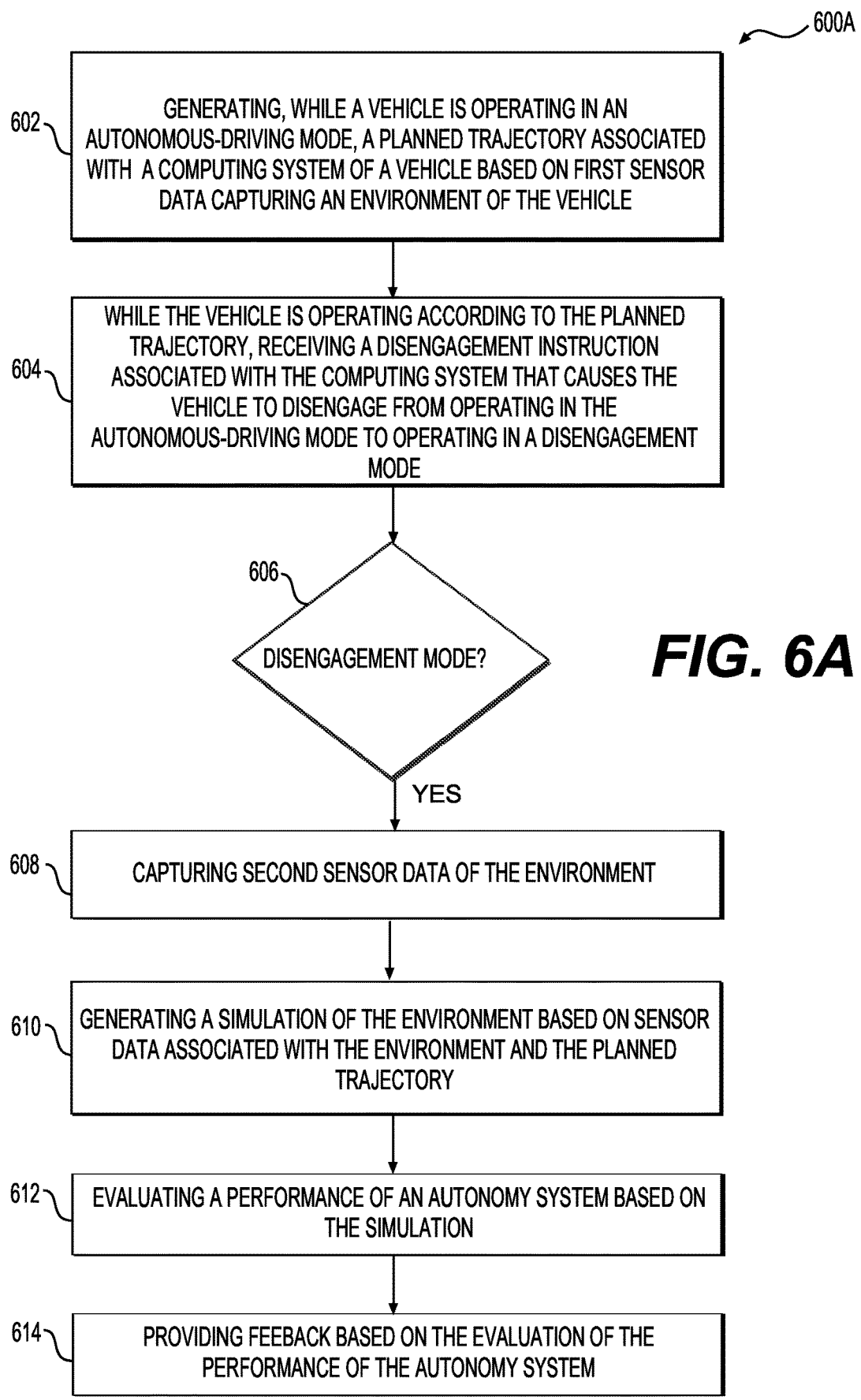
FIG. 6A illustrates a flow diagram of a method for determining and evaluating disengagements in autonomous vehicles or semi-autonomous vehicles based on perception data and providing actionable feedback to operations personnel.

FIG. 6A illustrates a flow diagram of a method 600A for determining and evaluating disengagements in autonomous vehicles or semi-autonomous vehicles based on perception data and prediction data and providing actionable feedback to operations personnel (e.g., supervisory drivers, technicians, developers, and so forth), in accordance with the presently disclosed techniques. The method 600A may be performed utilizing one or more processing devices (e.g., compute system 300A) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. It should be appreciated that the method 600A may be performed online (e.g., utilizing the vehicle 102 onboard compute in real time or near real-time or offline by one or more remote servers sometime later).

The method 600A may begin at block 602 with one or more processing devices (e.g., compute system 300A) generating, while a vehicle is operating in an autonomous-driving mode, a planned trajectory associated with the computing system of the vehicle based on first sensor data capturing an environment of the vehicle. The method 600A may then continue at block 604 with the one or more processing devices (e.g., compute system 300A), while the vehicle is operating according to the planned trajectory, receiving a disengagement instruction associated with the computing system of the vehicle that causes the vehicle to disengage from operating in the autonomous-driving mode and switch to operating in a disengagement mode. The method 600A may then continue at decision 606 with the one or more processing devices (e.g., compute system 300A) determining that the vehicle is operating in the disengagement-driving mode.

In certain embodiments, subsequent to the vehicle operating in the disengagement mode, the method 600A may continue at block 608 with the one or more processing devices (e.g., compute system 300A) capturing second sensor data of the environment of the vehicle. Further, subsequent to the vehicle operating in the disengagement mode, the method 600A may continue at block 610 with the one or more processing devices (e.g., compute system 300A) generating a simulation of the environment, wherein the simulation is based on sensor data associated with the environment and the planned trajectory. Still further, subsequent to the vehicle operating in the disengagement mode, the method 600A may continue at block 612 with the one or more processing devices (e.g., compute system 300A) evaluating a performance of an autonomy system based on the simulation, and concluding at block 614 with the one or more processing devices (e.g., compute system 300A) providing feedback based on the evaluation of the performance of the autonomy system.

Figure 6B:
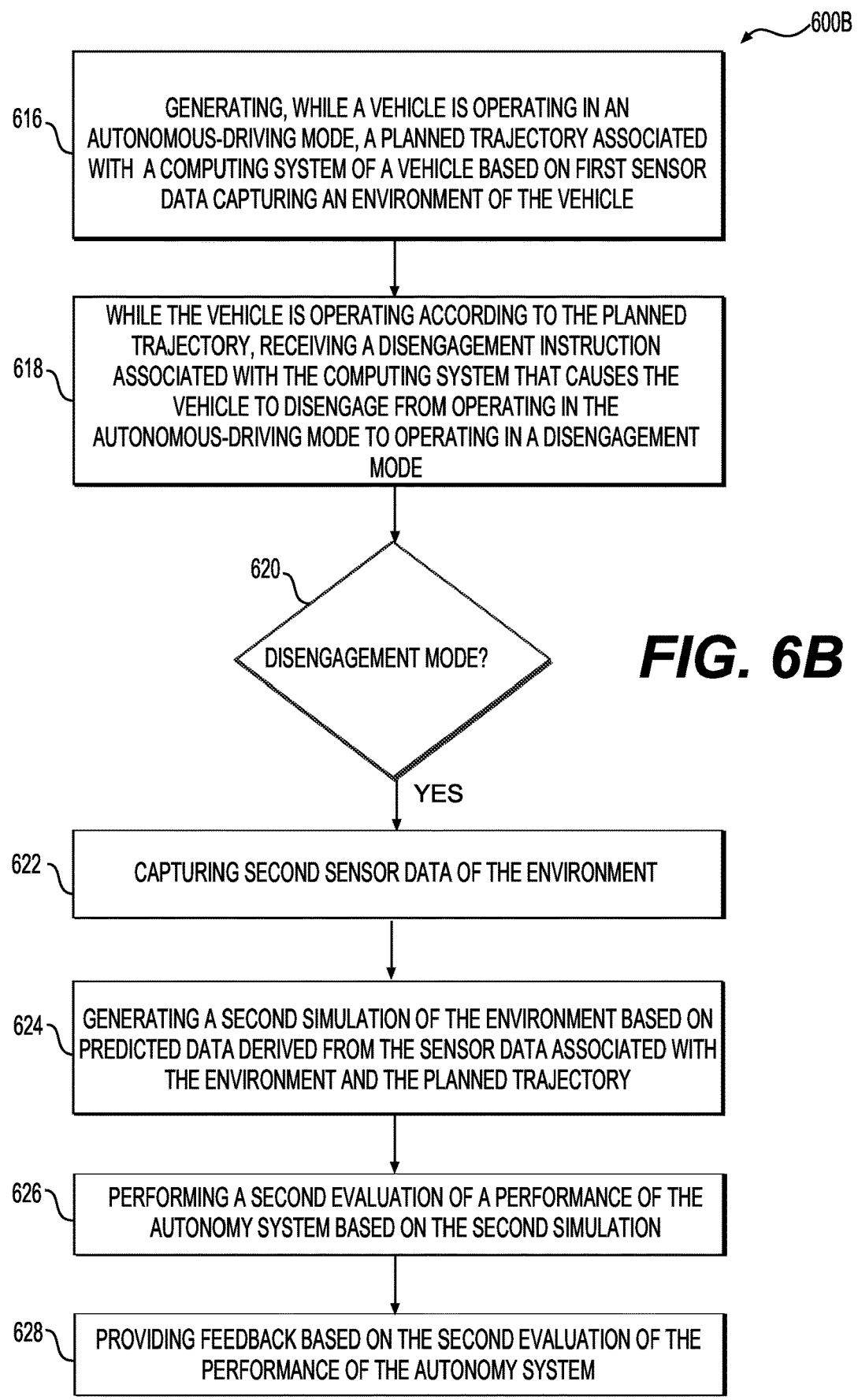
FIG. 6B illustrates a flow diagram of a method for determining and evaluating disengagements in autonomous vehicles or semi-autonomous vehicles based on prediction data and providing actionable feedback to operations personnel.

FIG. 6B illustrates a flow diagram of a method 600B for determining and evaluating disengagements in autonomous vehicles or semi-autonomous vehicles based on prediction data perception data and providing actionable feedback to operations personnel (e.g., supervisory drivers, technicians, developers, and so forth), in accordance with the presently disclosed techniques. The method 600B may be performed utilizing one or more processing devices (e.g., compute system 300B) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. As similarly discussed above, it should be appreciated that the method 600B may be performed online (e.g., utilizing the vehicle 102 onboard compute in real time or near real-time or offline by one or more remote servers sometime later).

The method 600B may begin at block 616 with one or more processing devices (e.g., compute system 300B) generating, while a vehicle is operating in an autonomous-driving mode, a planned trajectory associated with the computing system of the vehicle based on first sensor data capturing an environment of the vehicle. The method 600B may then continue at block 618 with the one or more processing devices (e.g., compute system 300B), while the vehicle is operating according to the planned trajectory, receiving a disengagement instruction associated with the computing system of the vehicle that causes the vehicle to disengage from operating in the autonomous-driving mode and switch to operating in a disengagement mode. The method 600B may then continue at decision 620 with the one or more processing devices (e.g., compute system 300B) determining that the vehicle is operating in the disengagement-driving mode.

In certain embodiments, subsequent to the vehicle operating in the disengagement mode, the method 600B may continue at block 622 with the one or more processing devices (e.g., compute system 300B) capturing second sensor data of the environment of the vehicle. Further, subsequent to the vehicle operating in the disengagement mode, the method 600B may continue at block 624 with the one or more processing devices (e.g., compute system 300B) generating a second simulation of the environment, wherein the second simulation is based on data derived from the sensor data associated with the environment and the planned trajectory. Still further, subsequent to the vehicle operating in the disengagement mode, the method 600B continue at block 626 with the one or more processing devices (e.g., compute system 300B) performing a second evaluation of a performance of the autonomy system based on the second simulation and concluding at block 628 with the one or more processing devices providing feedback based on the second evaluation of the performance of the autonomy system.

Accordingly, as described by the method 600A of FIG. 6A and the method 600B of FIG. 6B, the present techniques are directed toward determining and evaluating disengagements in autonomous vehicles or semi-autonomous vehicles 102 and providing actionable feedback to operations personnel (e.g., supervisory drivers, technicians, developers, and so forth) based thereon. In some embodiments, the present embodiments may include generating, based on sensor data, perception data that corresponds to perceived behavior of one or more agents 104 within the environment surrounding the vehicle 102. The perception data may be generated continuously based on continuous recording of raw sensor data by the vehicle 102, even after the vehicle 102 disengaged from autonomous-driving mode (e.g., sensor data may be captured over a time period commencing before the disengagement occurred and ending sometime after the disengagement occurred). After the disengagement is determined as having occurred, the compute system may evaluate and assess the disengagement by running a first simulation, based on a first simulation model, on the pre-disengagement planned trajectory of the vehicle 102 and post-disengagement perception data. That is, the pre-disengagement planned trajectory, which may be generated based on predicted agent behaviors, may be evaluated against actual agent 104 behaviors or movements perceived subsequent to the disengagement. For example, the actual behaviors or movements of one or more agents 104 within the environment may be simulated utilizing post-disengagement perception data, and the planned trajectory of the vehicle 102 may be simulated according to the pre-disengagement planned trajectory of the vehicle. The simulation may be used to determine what would have occurred had the vehicle 102 proceeded according to its planned trajectory with respect to the actual agent 104 behaviors or movements. In other words, the simulation provides a recreation of a presumptive driving scenario—based on the planned trajectory of the vehicle 102 and actual perception data—absent any disengagement event.

In other embodiments, after the disengagement is determined as having occurred, the compute system may evaluate and assess the disengagement by running a second simulation, based on a second simulation model, on the pre-disengagement planned trajectory of the vehicle 102 and prediction data generated based on pre-disengagement and/or post-disengagement perception data. That is, the pre-disengagement planned trajectory may be evaluated against predicted agent 104 behaviors or movements. In particular embodiments, the predicted agent 104 behaviors or movements may be generated using sensor and/or perception data captured prior to disengagement. In this case, the prediction data used to evaluate the pre-disengagement planned trajectory may be the same as the one used by the planning module 208 to generate the pre-disengagement planned trajectory. Since the prediction data in this embodiment only uses sensor and/or perception data captured prior to disengagement, the prediction data would not be influenced by the post-disengagement actions of the vehicle 102. In another embodiment, the predicted agent 104 behaviors or movements may have been generated based on sensor and/or perception data captured subsequent to the disengagement (e.g., 1 or 2 seconds of perceived contextual environment after the disengagement may be used to predict agent behavior in the next 10 seconds). In the first few seconds after disengagement (e.g., within 1 or 2 seconds), actual behavior of the agents 104 is unlikely to be significantly influenced by post-disengagement actions of the vehicle 102. Since the small window of post-disengagement perception data is unlikely to be tainted by the vehicle's 102 post-disengagement actions and is more up-to-date than pre-disengagement perception data, it may serve as a more reliable source of information for the prediction module 206 to predict a contextual environment in which the vehicle 102 had not disengaged. During simulation, behaviors or movements of one or more agents 104 within the environment may be simulated based on the prediction data, and movements of the vehicle 102 may be simulated using the pre-disengagement planned trajectory. The simulation would indicate what would have likely occurred had the vehicle 102 continued operating in the autonomous-driving mode (e.g., the simulation generates a recreation of a presumptive driving scenario—based on the planned trajectory of the vehicle 102 and predicted data—absent any disengagement event). In certain embodiments, one or more of the first evaluation based on the first simulation model and the second evaluation based on the second simulation model may be utilized to generate an evaluation score (e.g., the score may represent an appropriateness of the disengagement).

In this way, disengagements may be evaluated and assessed quickly, objectively, and accurately to determine whether a particular disengagement was appropriate or inappropriate, and actionable feedback may be generated (e.g., in real-time or near real-time). As previously explained, the speed at which the post-disengagement evaluation is performed is important (e.g., to give prompt feedback to the supervisor driver and/or alert the fleet of a potential systemic issue). Thus, in one embodiment, the on-board computing system of the vehicle 102 may perform the simulation and evaluation after the vehicle 102 disengaged from autonomous-driving mode. After disengagement, the on-board computing system of the vehicle 102 would no longer be occupied with active driving tasks, so the on-board computing system could be re-purposed to perform post-disengagement simulation and evaluation tasks. While using the computing system of the vehicle 102 would likely provide the fastest results, it may not always be the case. For example, a cloud-based service might be able to perform the same computation much faster than the computing system of the vehicle to offset the transmission time needed for the vehicle 102 to wirelessly transfer the relevant data to the cloud-based service (e.g., the pre-disengagement planned trajectory, perception data, and/or prediction data). Thus, in particular embodiments, the vehicle 102 may offload the simulation and evaluation tasks to a cloud-based service.

The evaluation results of the disengagement may trigger one or more events. In one embodiment, the event may be an actionable feedback for the supervisory driver of the vehicle 102. For example, one or more notifications indicating whether the disengagement is appropriate or inappropriate may be provided to the driver (e.g., via a display, sound, or haptic feedback). The notifications may be used to train the supervisory driver of the vehicle 102 to disengage more consistently or judiciously. For example, after disengagement, the driver may be notified in real-time or near real-time of whether the disengagement was appropriate under the circumstances. The promptness of the notification helps ensure that the context that caused the driver to disengage is still fresh in the driver's mind. As such, the driver is enabled to more easily connect the context surrounding the disengagement with the provided feedback and adjust his/her future reactions to similar future contexts accordingly. For example, if the driver of vehicle 102A in scenario 100A received a notification that the disengagement was appropriate, the driver would learn to continue to disengage in similar circumstances. If the driver of vehicle 102B or 102C in scenario 100B or 100C received a notification that the disengagement was inappropriate, the driver would learn that disengagement is unnecessary in those circumstances.

In another embodiment, the actionable feedback triggered by the disengagement evaluation may include, for example, one or more notifications of an operation health (and degree of severity) of one or more systems of the vehicle 102 that may be provided to a cloud-based service or fog-based service to perform troubleshooting, updating, system shutdown, or other protocol to maximize safety and operational efficiency and efficacy of the vehicle 102. For example, when a disengagement is deemed appropriate, it may indicate that there is an edge-case that is not being appropriately handled by the vehicle's 102 autonomous-driving system. As such, the vehicle 102 may notify the fleet management system or developers of the vehicle 102 so that they may handle the issue as needed. In particular embodiments, the outcome of the simulation may further be used to gauge the severity of the operation health of the vehicle 102 and trigger different degrees of notifications accordingly. For example, if the simulation reveals that the vehicle 102 would have collided had the driver not disengaged the vehicle 102 from autonomous-driving mode, an alert may be sent to the fleet management system or developers so that they could commence a fleet-wide shut down if deemed necessary. If instead the simulation reveals that the vehicle 102 would have gotten undesirably close to another vehicle but no collision would have occurred, then the vehicle 102 may simply flag or store the relevant scenario in the on-board computing system to allow the scenario to be reviewed when time permits, without ever sending a real-time or near real-time notification to the fleet management system or developers of the vehicle 102.

Figure 7:
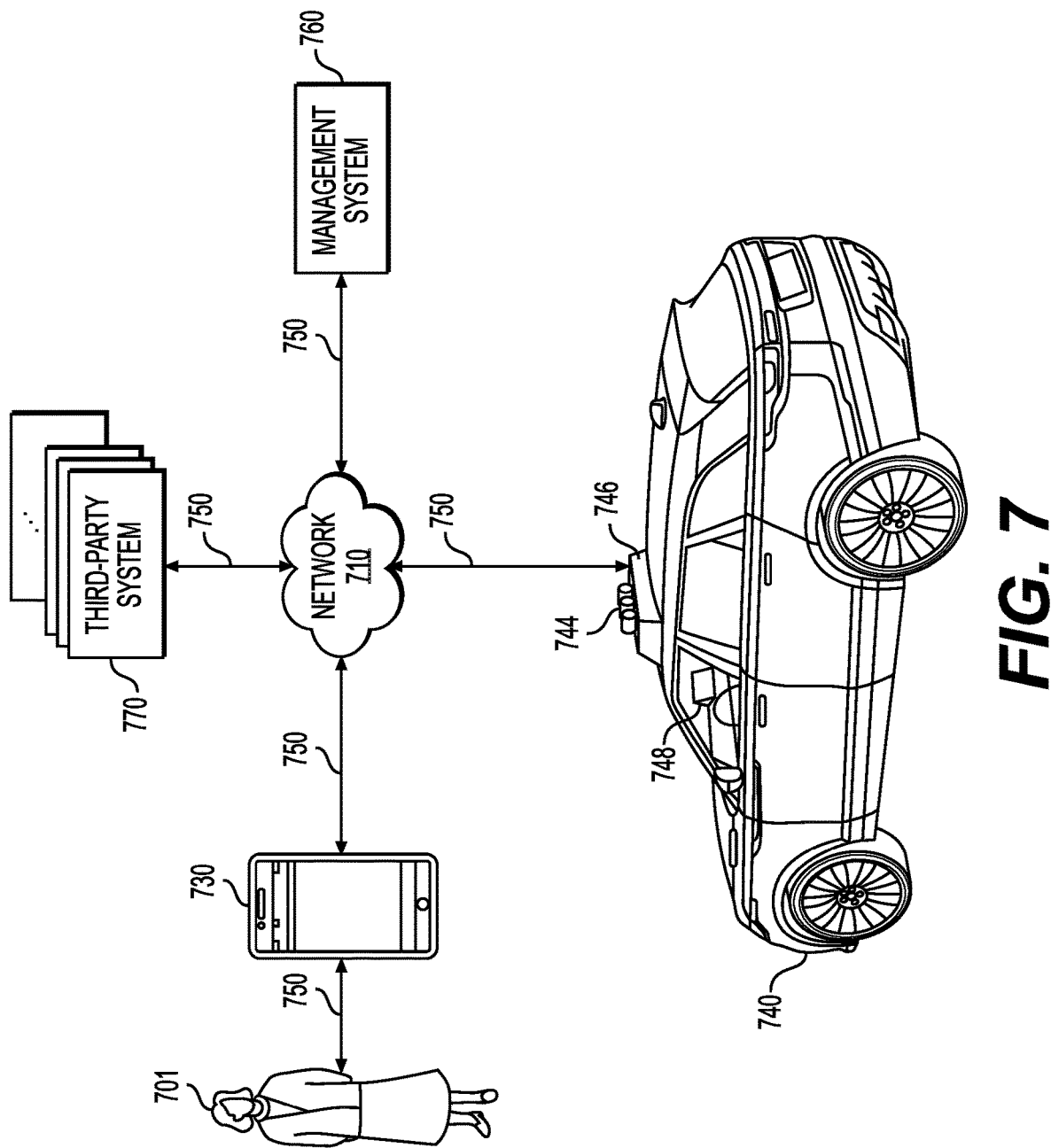
FIG. 7 illustrates an example block diagram of a transportation management environment.

FIG. 7 illustrates an example block diagram of a transportation management environment that may be utilized to perform one or more of the forgoing embodiments as discussed herein. In certain embodiments, the environment may include various computing entities, such as a user computing device 730 of a user 701 (e.g., a ride provider or requestor), a transportation management system 760, an autonomous or semi-autonomous vehicle 740, and one or more third-party system 770. The computing entities may be communicatively connected over any suitable network 710. For example, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In certain embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. For example, the network environment may include multiple users 701, user devices 730, transportation management system 760, autonomous or semi-autonomous vehicles 740, third-party systems 770, and networks 710.

The user device 730, transportation management system 760, autonomous or semi-autonomous vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, and so forth), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP).

FIG. 7 illustrates transmission links 750 that connect user device 730, autonomous or semi-autonomous vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In certain embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities may not necessarily use the same type of transmission link 750. For example, the user device 730 may communicate with the transportation management system via a cellular network and the Internet but communicate with the autonomous vehicle 740 via Bluetooth or a physical wire connection.

In certain embodiments, the transportation management system 760 may fulfill ride requests for one or more users 701 by dispatching suitable vehicles. The transportation management system 760 may receive any number of ride requests from any number of ride requestors 701. In certain embodiments, a ride request from a ride requestor 701 may include an identifier that identifies the ride requestor in the system 760. The transportation management system 760 may utilize the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In certain embodiments, ride requestor information may include profile information about a particular ride requestor 701.

In certain embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when traveling at various speeds, route, and so forth), entertainment preferences and settings (e.g., preferred music genre or playlist, audio volume, display brightness, and so forth), temperature settings, whether conversation with the driver is welcomed, frequent destinations, historical riding patterns (e.g., time of day of travel, starting and ending locations, and so forth), preferred language, age, gender, or any other suitable information. In certain embodiments, the transportation management system 760 may classify a user 701 based on known information about the user 701 (e.g., using ML classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. For example, when the transportation management system 760 receives a request to travel from San Francisco International Airport (SFO) to Palo Alto, California, the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride.

In certain embodiments, portions of the ride information may be based on historical data associated with historical rides facilitated by the system 760. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, and so forth), a category/class of users (e.g., based on demographics), and/or all users of the system 760. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, and so forth.

As yet another example, historical data associated with all users may include general usage trends, such as traffic and ride patterns. Using historical data, the system 760 in certain embodiments may predict and provide ride suggestions in response to a ride request. In certain embodiments, the system 760 may utilize machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable ML algorithms known to persons of ordinary skill in the art. The ML models may be trained using any suitable training algorithm, including supervised learning based on labeled training data, unsupervised learning based on unlabeled training data, and/or semi-supervised learning based on a mixture of labeled and unlabeled training data.

In certain embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In certain embodiments, each server may include hardware, software, or embedded logic components or a combination of two or more such components for carrying out the appropriate functionalities implemented or supported by the server.

In certain embodiments, transportation management system 760 may include one or more data stores. The data stores may be used to store various types of information, such as ride information, ride requestor information, ride provider information, historical information, third-party information, or any other suitable type of information. In certain embodiments, the information stored in the data stores may be organized according to specific data structures. In certain embodiments, each data store may be a relational, columnar, correlation, or any other suitable type of database system. Although this disclosure describes or illustrates particular types of databases, this disclosure contemplates any suitable types of databases. Certain embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In certain embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In certain embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In certain embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are to be accessed the third-party system 770, the user 701 may provide such information to the transportation management system 760, which may serve as a proxy for accessing content from the third-party system 770.

In certain embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and/or 2G/3G/4G/LTE/5G mobile communication standard. User device 730 may also include one or more cameras, scanners, touchscreens, microphones, speakers, and any other suitable input-output devices.

In certain embodiments, the vehicle 740 may be an autonomous or semi-autonomous vehicle and equipped with an array of sensors 744, a navigation system 746, and a ride-service computing device 748. In certain embodiments, a fleet of autonomous or semi-autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In certain embodiments, the autonomous or semi-autonomous vehicles 740 may receive data from and transmit data to the transportation management system 760 and the third-party system 770. Example of received data may include, e.g., instructions, new software or software updates, maps, 3D models, trained or untrained ML models, location information (e.g., location of the ride requestor, the autonomous or semi-autonomous vehicle 740 itself, other vehicles 740, and target destinations such as service centers), navigation information, traffic information, weather information, entertainment content (e.g., music, video, and news) ride requestor information, ride information, and any other suitable information. Examples of data transmitted from the autonomous or semi-autonomous vehicle 740 may include, e.g., telemetry and sensor data, determinations/decisions based on such data, vehicle condition or state (e.g., battery/fuel level, tire and brake conditions, sensor condition, speed, odometer, and so forth), location, navigation data, passenger inputs (e.g., through a user interface in the vehicle 740, passengers may send/receive data to the transportation management system 760 and/or third-party system 770), and any other suitable data.

In certain embodiments, autonomous or semi-autonomous vehicles 740 may also communicate with each other as well as other traditional human-driven vehicles, including those managed and not managed by the transportation management system 760. For example, one vehicle 740 may communicate with another vehicle data regarding their respective location, condition, status, sensor reading, and any other suitable information. In certain embodiments, vehicle-to-vehicle communication may take place over direct short-range wireless connection (e.g., WI-FI, Bluetooth, NFC) and/or over a network (e.g., the Internet or via the transportation management system 760 or third-party system 770).

In certain embodiments, an autonomous or semi-autonomous vehicle 740 may obtain and process sensor/telemetry data. Such data may be captured by any suitable sensors. For example, the vehicle 740 may have a LiDAR sensor array of multiple LiDAR transceivers that are configured to rotate 360°, emitting pulsed laser light and measuring the reflected light from objects surrounding vehicle 740. In certain embodiments, LiDAR transmitting signals may be steered by use of a gated light valve, which may be a MEMs device that directs a light beam using the principle of light diffraction. Such a device may not use a gimbaled mirror to steer light beams in 360° around the autonomous or semi-autonomous vehicle. Rather, the gated light valve may direct the light beam into one of several optical fibers, which may be arranged such that the light beam may be directed to many discrete positions around the autonomous or semi-autonomous vehicle. Thus, data may be captured in 360° around the autonomous or semi-autonomous vehicle, but no rotating parts may be necessary. A LiDAR is an effective sensor for measuring distances to targets, and as such may be used to generate a 3D model of the external environment of the autonomous or semi-autonomous vehicle 740. For example, the 3D model may represent the external environment including objects such as other cars, curbs, debris, objects, and pedestrians up to a maximum range of the sensor arrangement (e.g., 50 meters, 100 meters, or 200 meters).

As another example, the autonomous or semi-autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In certain embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection.

While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on the autonomous or semi-autonomous vehicle 740. Example locations for sensors include the front and rear bumpers, the doors, the front windshield, on the side panel, or any other suitable location.

In certain embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest. In certain embodiments, the autonomous vehicle 740 may have a navigation system 746 responsible for safely navigating the autonomous vehicle 740. In certain embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, and so forth). In certain embodiments, the navigation system 746 may utilize its determinations to control the vehicle 740 to operate in prescribed manners and to guide the autonomous vehicle 740 to its destinations without colliding into other objects. Although the physical embodiment of the navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In certain embodiments, the autonomous or semi-autonomous vehicle 740 may be equipped with a ride-service computing device 748, which may be a tablet computer, or any other suitable device installed by transportation management system 760 to allow the user to interact with the autonomous vehicle 740, transportation management system 760, other users 701, or third-party systems 770. In certain embodiments, installation of ride-service computing device 748 may be accomplished by placing the ride-service computing device 748 inside autonomous vehicle 740, and further configuring it to communicate with the vehicle 740 via a wire or wireless connection (e.g., via Bluetooth). Although FIG. 7 illustrates a single ride-service computing device 748 at a particular location in autonomous vehicle 740, autonomous or semi-autonomous vehicle 740 may include several ride-service computing devices 748 in several different locations within the vehicle.

For example, the autonomous or semi-autonomous vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In certain embodiments, ride-service computing device 748 may be detachable from any component of autonomous vehicle 740. This may allow users to handle ride-service computing device 748 in a manner consistent with other tablet computing devices. For example, a user may move ride-service computing device 748 to any location in the cabin or passenger compartment of the autonomous or semi-autonomous vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
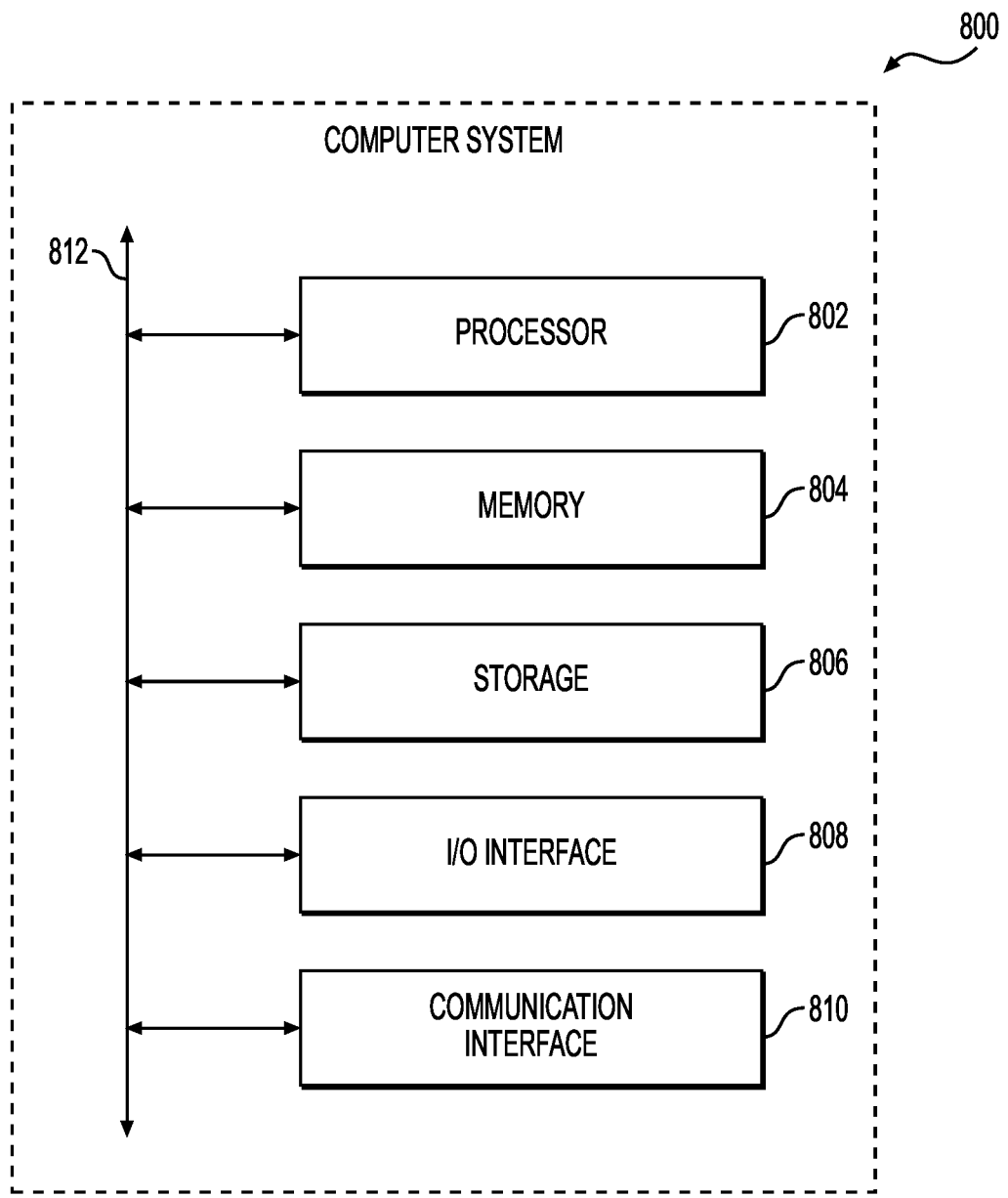
FIG. 8 illustrates an example of a computing system.

FIG. 8 illustrates an example computer system 800 that may be utilized to perform one or more of the forgoing embodiments as discussed herein. In certain embodiments, one or more computer systems 800 perform one or more steps of one or more methods described or illustrated herein. In certain embodiments, one or more computer systems 800 provide the functionalities described or illustrated herein. In certain embodiments, software running on one or more computer systems 800 performs one or more steps of one or more methods described or illustrated herein or provides the functionalities described or illustrated herein. Certain embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. For example, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In certain embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In certain embodiments, processor 802 includes hardware for executing instructions, such as those making up a computer program. For example, to execute instructions, processor 802 may retrieve (or fetch) the instructions from an internal register, an internal cache, memory 804, or storage 806; decode and execute them; and then write one or more results to an internal register, an internal cache, memory 804, or storage 806. In certain embodiments, processor 802 may include one or more internal caches for data, instructions, or addresses. This disclosure contemplates processor 802 including any suitable number of any suitable internal caches, where appropriate. For example, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In certain embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In certain embodiments, memory 804 includes main memory for storing instructions for processor 802 to execute or data for processor 802 to operate on. For example, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804.

In certain embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In certain embodiments, one or more memory management units (MMUs) reside between processor 802 and memory 804 and facilitate accesses to memory 804 requested by processor 802. In certain embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In certain embodiments, storage 806 includes mass storage for data or instructions. For example, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In certain embodiments, storage 806 is non-volatile, solid-state memory. In certain embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In certain embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. For example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In certain embodiments, communication interface 810 includes hardware, software, or both providing one or more interfaces for communication (such as, for example, packet-based communication) between computer system 800 and one or more other computer systems 800 or one or more networks. For example, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. For example, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In certain embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

The invention claimed is:

1. A method comprising, by a computing system:
generating, while a vehicle is operating in an autonomous-driving mode, a planned trajectory associated with the computing system of the vehicle based on first sensor data capturing an environment of the vehicle;
while the vehicle is operating according to the planned trajectory, receiving a disengagement instruction associated with the computing system of the vehicle that causes the vehicle to disengage from operating in the autonomous-driving mode and switch to operating in a disengagement mode; and
subsequent to the vehicle operating in the disengagement mode: capturing second sensor data of the environment;
generating a first simulation of the environment, wherein the first simulation is based on (i) the second sensor data associated with the environment, and (ii) the planned trajectory, and a second simulation based on the first sensor data and the planned trajectory, wherein the first simulation is based on actual agent behaviors perceived in the second sensor data and the second simulation is based on the planned trajectory and predicted data derived from the first sensor data;
evaluating a performance of an autonomy system based on the first simulation and the second simulation; and
providing feedback based on the performance of the autonomy system in the first simulation and the second simulation.

2. The method of claim 1, wherein, in the disengagement mode, the vehicle is controlled by a human driver, and wherein providing feedback based on the evaluation of the performance of the autonomy system comprises presenting real-time feedback to the human driver.

3. The method of claim 2, wherein the real-time feedback comprises contextual information.

4. The method of claim 1, further comprising:
generating an evaluation score based on assigning the performance for the first simulation a first weight and assigning the performance for the second simulation a second weight, wherein the feedback is based at least in part on the evaluation score.

5. The method of claim 4, wherein assigning further comprises:
determining a first estimated time to collision (TTC) based on the performance for the first simulation, wherein the first estimated TTC is associated with the first weight; and
determining a second estimated TTC based on the performance for the second simulation, wherein the second estimated TTC is associated with the second weight.

6. The method of claim 5, further comprises:
comparing the first estimated TTC to the second estimated TTC; and
assigning a greater weight to the first weight or the second weight based on whether the first estimated TTC is less than the second estimated TTC.

7. The method of claim 1, wherein evaluating the performance of the autonomy system further comprises determining an appropriateness of the disengagement instruction based on at least one of the first simulation or the second simulation.

8. The method of claim 1, wherein the disengagement instruction is provided by a driver of the vehicle, and an alert informs the driver of an appropriateness of the disengagement instruction that caused the vehicle to disengage from operating in the autonomous-driving mode.

9. The method of claim 1, wherein evaluating the performance of the autonomy system further comprises:
determining, based on the first simulation, whether a collision were to occur had the vehicle continued operating in the autonomous-driving mode; and determining a degree of severity of the collision.

10. The method of claim 9, further comprising: prior to providing the feedback based on the evaluation of the performance of the autonomy system:
determining and prioritizing one or more levels of feedback to be provided based on the degree of severity of the collision, wherein determining and prioritizing the one or more levels of feedback comprises flagging the collision according to the degree of severity being less than a predetermined threshold and providing instantaneous feedback associated with the collision when the degree of severity exceeds the predetermined threshold.

11. The method of claim 8, wherein generating the first simulation of the environment comprises generating the first simulation utilizing an on-vehicle compute system or a compute system remote from the vehicle.

12. A system, comprising:
one or more non-transitory computer-readable storage media including instructions; and one or more processors coupled to the storage media, the one or more processors configured to execute the instructions to:
generate, while a vehicle is operating in an autonomous-driving mode, a planned trajectory associated with the system of the vehicle based on first sensor data capturing an environment of the vehicle;

while the vehicle is operating according to the planned trajectory, receive a disengagement instruction associated with the computing system of the vehicle that causes the vehicle to disengage from operating in the autonomous-driving mode and switch to operating in a disengagement mode; and subsequent to the vehicle operating in the disengagement mode:

capture second sensor data of the environment;

generate a first simulation of the environment, wherein the first simulation is based on (i) the second sensor data, and (ii) the planned trajectory, and a second simulation based on the first sensor data and the planned trajectory, wherein the first simulation is based on actual agent behaviors perceived in the second sensor data and the second simulation is based on the planned trajectory and predicted data derived from the first sensor data;

evaluate a performance of an autonomy system based on the first simulation and the second simulation; and provide feedback based on the performance of the autonomy system in the first simulation and the second simulation.

13. The system of claim 12, the one or more processors further configured to execute the instructions to:

generate an evaluation score based on assigning the first simulation a first weight and assigning the second simulation a second weight, wherein the feedback is based at least in part on the evaluation score.

14. The system of claim 13, wherein to assign the performance for the first simulation the first weight and assign the performance for the second simulation the second weight, the one or more processors being further configured to execute the instructions to:

determine a first estimated time to collision (TTC) based on the performance for the first simulation, wherein the first estimated TTC is associated with the first weight; and determine a second estimated TTC based on the performance for the second simulation, wherein the second estimated TTC is associated with the second weight.

15. The system of claim 14, the one or more processors further configured to execute the instructions to:

compare the first estimated TTC to the second estimated TTC; and assign a greater weight to the first weight or the second weight based on whether the first estimated TTC is less than the second estimated TTC.

16. The system of claim 12, wherein to evaluate the performance of the autonomy system, the one or more processors being further configured to execute the instructions to determine an appropriateness of the disengagement instruction based on at least one of the first simulation or the second simulation.

17. A non-transitory computer-readable medium comprising instructions that, when executed by one or more processors of a computing device, cause the one or more processors to:

generate, while a vehicle is operating in an autonomous-driving mode, a planned trajectory associated with the computing system of the vehicle based on first sensor data capturing an environment of the vehicle;

while the vehicle is operating according to the planned trajectory, receive a disengagement instruction associated with the computing system of the vehicle that causes the vehicle to disengage from operating in the autonomous-driving mode and switch to operating in a disengagement mode; and subsequent to the vehicle operating in the disengagement mode: capture second sensor data of the environment;

generate a first simulation of the environment, wherein the first simulation is based on (i) the second sensor data associated with the environment, and (ii) the planned trajectory, and a second simulation based on the first sensor data and the planned trajectory, wherein the first simulation is based on actual agent behaviors perceived in the second sensor data and the second simulation is based on the planned trajectory and predicted data derived from the first sensor data;

evaluate a performance of an autonomy system based on the first simulation and the second simulation; and provide feedback based on the performance of the autonomy system in the first simulation and the second simulation.

* * * * *